US012217638B2

(12) United States Patent
Zhang et al.

(10) Patent No.: US 12,217,638 B2
(45) Date of Patent: Feb. 4, 2025

(54) DISPLAY PANEL, DISPLAY DEVICE, AND METHOD FOR DRIVING DISPLAY DEVICE

(71) Applicant: BOE Technology Group Co., Ltd., Beijing (CN)

(72) Inventors: Hui Zhang, Beijing (CN); Changfeng Li, Beijing (CN); Kai Hou, Beijing (CN); Liwei Liu, Beijing (CN); Hongrun Wang, Beijing (CN); Yunsik Im, Beijing (CN); Shunhang Zhang, Beijing (CN); Kuanjun Peng, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/276,687

(22) PCT Filed: Jul. 2, 2021

(86) PCT No.: PCT/CN2021/104257
§ 371 (c)(1),
(2) Date: Aug. 10, 2023

(87) PCT Pub. No.: WO2023/272719
PCT Pub. Date: Jan. 5, 2023

(65) Prior Publication Data
US 2024/0127724 A1 Apr. 18, 2024

(51) Int. Cl.
*G09G 3/00* (2006.01)
*G09G 3/36* (2006.01)

(52) U.S. Cl.
CPC ........... *G09G 3/001* (2013.01); *G09G 3/3607* (2013.01); *G09G 2300/0452* (2013.01);
(Continued)

(58) Field of Classification Search
None
See application file for complete search history.

(56) References Cited

U.S. PATENT DOCUMENTS 10,008,163 B1 * 6/2018 Cui ...................... G09G 3/3607
10,991,290 B1 * 4/2021 Yang ........................ G09G 3/20
(Continued)

FOREIGN PATENT DOCUMENTS

WO 2006/100950 A1 9/2006

OTHER PUBLICATIONS

Extended European Search Report received for European Patent Application No. 21947667.8, mailed on Apr. 24, 2024, 17 pages.

*Primary Examiner* — Patrick N Edouard
*Assistant Examiner* — Peijie Shen
(74) *Attorney, Agent, or Firm* — ArentFox Schiff LLP; Michael Fainberg

(57) ABSTRACT

A display panel, a display device, and a method for driving the display device are disclosed. The display panel includes a base substrate, a plurality of data lines, a plurality of scanning lines, a plurality of sub-pixels, a plurality of data selection control lines, a plurality of data input lines, and a plurality of data selection circuits. The data selection circuits include at least two multiplexers; in each data selection circuit, input terminals of different multiplexers are coupled to different data input lines, control terminals of different multiplexers are coupled to different data selection control lines, and the ith output terminals of different multiplexers are coupled to the same data line; in two adjacent data selection circuits, two multiplexers coupled to different data selection control lines are coupled to the same data input line.

19 Claims, 10 Drawing Sheets

(52) U.S. Cl.
CPC ............... *G09G 2310/0262* (2013.01); *G09G 2310/0281* (2013.01); *G09G 2310/0283* (2013.01); *G09G 2310/0297* (2013.01); *G09G 2330/021* (2013.01); *G09G 2340/00* (2013.01); *G09G 2354/00* (2013.01); *G09G 2370/00* (2013.01)

(56) References Cited

U.S. PATENT DOCUMENTS

| | | | | |
|---|---|---|---|---|
| 2003/0067422 | A1 | 4/2003 | Suyama et al. | |
| 2007/0040764 | A1 * | 2/2007 | Kim | G09G 3/3291 345/30 |
| 2008/0079804 | A1 | 4/2008 | Hamagishi et al. | |
| 2008/0252588 | A1 * | 10/2008 | Huang | G09G 3/20 345/100 |
| 2009/0015574 | A1 * | 1/2009 | Kim | G09G 3/3688 345/94 |
| 2012/0249603 | A1 * | 10/2012 | Ban | G09G 3/3688 345/88 |
| 2014/0015821 | A1 * | 1/2014 | Hwang | G09G 3/20 345/211 |
| 2014/0210875 | A1 * | 7/2014 | Sumi | H04N 13/305 345/697 |
| 2017/0061853 | A1 * | 3/2017 | Yang | G09G 3/2085 |
| 2019/0012947 | A1 * | 1/2019 | Cheng | G09G 3/3688 |
| 2019/0147786 | A1 | 5/2019 | Kim et al. | |
| 2021/0035519 | A1 * | 2/2021 | Tagawa | G09G 3/3688 |
| 2023/0306914 | A1 * | 9/2023 | Lee | G09G 3/3233 |

* cited by examiner

DISPLAY PANEL, DISPLAY DEVICE, AND METHOD FOR DRIVING DISPLAY DEVICE

This application is a National Stage of International Application No. PCT/CN2021/104257, filed on Jul. 2, 2021, which is hereby incorporated by reference in its entirety.

TECHNICAL FIELD

The present disclosure relates to the technical field of display, in particular to a display panel, a display device, and a method for driving a display device.

BACKGROUND

With the continuous development of display technology, three-dimensional (3D) display technology has attracted more and more attention. Three-dimensional display technology can make the display screen become three-dimensional and realistic. The principle of the 3D display technology is to use the left and right eyes of a person to receive the left-eye image and the right-eye image with a parallax respectively. After the two images with the parallax are respectively received by the left and right eyes of the person, the brain superimposes and fuses the image information to construct a 3D visual display effect.

In order to realize the compatibility of ultra-multi-viewpoint 3D display and light field display, the traditional sub-pixels are made into a pixel island structure, and each pixel island includes a plurality of sub-pixels. When display information of the plurality of sub-pixels is different, light field 3D display can be realized. The plurality of sub-pixels is grouped, and when each group of sub-pixels is combined for display, super multi-viewpoint 3D display can be realized. However, in the related art, each group of sub-pixels combined for display can only be provided with the same display information, that is, it can only be realized that each group of sub-pixels in the pixel island is fixedly combined for display. When positions of human eyes change, the sub-pixels combined for display cannot be changed accordingly.

SUMMARY

Embodiments of the present application provide a display panel, and the display panel includes:

- a base substrate, including a display region and a peripheral region disposed outside the display region;
- a plurality of data lines, located at a side of the base substrate, and extending from the display region to the peripheral region; where each of the plurality of data lines extends along a first direction, and the plurality of data lines are arranged along a second direction; and the first direction intersects with the second direction;
- a plurality of scan lines, located at the side of the base substrate; each of the plurality of scan lines extends along the second direction and the plurality of scan lines are arranged along the first direction;
- a plurality of sub-pixels, respectively located at regions defined by the plurality of scan lines and the plurality of data lines; where at least two sub-pixels adjacent in the first direction and the second direction form a pixel island; and color of light emitted by any two adjacent sub-pixels in the second direction is identical;
- a plurality of data selection control lines, arranged at the peripheral region and located at a same side of the base substrate as the plurality of data lines;
- a plurality of data input lines, arranged at the peripheral region and locate at the same side of the base substrate as the plurality of data selection control lines; and
- a plurality of data selection circuits, arranged at the peripheral and located at the same side of the base substrate as the plurality of data selection control lines; where each data selection circuit includes at least two multiplexers; in each data selection circuit, input terminals of different multiplexers are coupled to different data input lines, control terminals of different multiplexers are coupled to different data selection control lines, and the i-th output terminals of different multiplexers are coupled to a same data line, and i is a positive integer; in two adjacent data selection circuits, two multiplexers connected with different data selection control lines are coupled to a same data line; and each of the plurality of data selection circuits is configured to: under control of signals of the plurality of data selection control lines, respectively provide a signal of a corresponding data input line to each coupled data line.

In some embodiments, the pixel island includes a plurality of sub-pixel rows arranged along the first direction; each sub-pixel row includes: h number of sub-pixels arranged along the second direction; each sub-pixel row is divided into a number of sub-pixel groups, each sub-pixel group includes f number of sub-pixels, wherein, a=h/f, a, h, f are all positive integers greater than 1;

- each sub-pixel group is coupled to a data selection circuit through data lines, and different sub-pixel groups are coupled to different data selection circuits through corresponding data lines; and
- each multiplexer includes f number of output terminals, f number of input terminals, and f number of control terminals.

In some embodiments, each data selection circuit includes a first multiplexer and a second multiplexer; a quantity m of the plurality of data selection circuits and a quantity n of the plurality of data input lines satisfy: n=m+1; and a first multiplexer of the j-th data selection circuit and a second multiplexer of the (j+1)-th data selection circuit are coupled to the j-th data input line, wherein j is a positive integer smaller than m.

In some embodiments, the first multiplexer includes f number of first selection switches; control electrodes of different first selection switches are coupled to different data selection control lines; first electrodes of different first selection switches are coupled to a same data input line; and second electrodes of different first selection switches are coupled to different data lines;

- the second multiplexer includes f number of second selection switches; control electrodes of different second selection switches are coupled to different data selection control lines; first electrodes of different second selection switches are coupled to a same data input line; and second electrodes of different second selection switches are coupled to different data lines; and
- in each data selection circuit, a second electrode of the i-th first selection switch in the first multiplexer and a second electrode of the i-th second selection switch in the second multiplexer are coupled to a same data line.

In some embodiments, the first selection switch includes a first transistor; a control electrode of the first transistor is coupled to a data selection control line, and a first electrode of the first transistor is coupled to a data input line, a second electrode of the first transistor is coupled to a data line; and the second selection switch includes a second transistor; a control electrode of the second transistor is coupled to a data selection control line, a first electrode of the second transistor is coupled to a data input line, and a second electrode of the second transistor is coupled to a data line.

In some embodiments, the display panel includes 2f number of data selection control lines.

In some embodiments, control electrodes of the i-th first selection switches in different data selection circuits are coupled to a same data selection control line; and control electrodes of the i-th second selection switches in different data selection circuits are coupled to a same data selection control line.

In some embodiments, the pixel island includes: a first sub-pixel row, a second sub-pixel row and a third sub-pixel row that are arranged along the first direction;

the first sub-pixel row includes a plurality of sub-pixels with first color arranged along the second direction;

the second sub-pixel row includes a plurality of sub-pixels with second color arranged along the second direction; and the third sub-pixel row includes a plurality of sub-pixels with third color arranged along the second direction.

In some embodiments, each sub-pixel row in the pixel island includes 16 number of sub-pixels; each sub-pixel row is divided into 4 number of sub-pixel groups, and each sub-pixel group includes 4 number of sub-pixels; and each multiplexer includes 4 number of input terminals, 4 number of control terminals and 4 number of output terminals.

Embodiments of the present disclosure provide a display device, including the display panel according to embodiments of the present disclosure.

In some embodiments, the display device further includes: a lenticular lens structure, located at a light emitting side of the display panel; and the lenticular lens structure includes a plurality of lenticular lenses arranged in an array.

In some embodiments, the display device further includes: a human eye-tracking system, configured to determine a gaze region of user's eyes on the display device in real time.

Embodiments of present disclosure provide a method for driving the display device, including:

determining a current display mode, and determining a gaze region of user's eyes on the display panel in real time;

determining display information of each sub-pixel of a pixel island corresponding to the gaze region according to the current display mode and the gaze region; and providing data selection control signals to data selection control lines according to the display information; and providing a data signal corresponding to the display information provided by a data input line to each data line corresponding to the pixel island in the gaze region through data selection circuits.

In some embodiments, the determining the gaze region of the user's eyes on the display panel in real time includes:

acquiring the gaze region of the user's eyes on the display panel through a human eye-tracking system;

the determining the display information of each sub-pixel of the pixel island corresponding to the gaze region according to the current display mode and the gaze region, includes:

determining view information viewed by the user according to the current display mode and the gaze region of the user's eyes on the display panel; and determining a target sub-pixel in a pixel island corresponding to the view information according to the view information, and determining display information of the target sub-pixel corresponding to the view information.

In some embodiments, the determining the current display mode includes:

determining that the current display mode is a first display mode when system resource occupancy of the display device meets a preset condition; wherein, in the first display mode, each sub-pixel in a sub-pixel row of the pixel island corresponds to one viewpoint; and determining that the current display mode is a second display mode when the system resource occupancy of the display device does not meet the preset condition; wherein, in the second display mode, f number of adjacent sub-pixels in a sub-pixel row of the pixel island correspond to one viewpoint, wherein the sub-pixel row of the pixel island includes h number of sub-pixels, h/f is a positive integer; h and f are both positive integers greater than 1.

In some embodiments, each data selection circuit includes a first multiplexer and a second multiplexer, the first multiplexer includes f number of first selection switches, and the second multiplexer includes f number of second selection switches;

when determining that the current display mode is the first display mode, the providing the data selection control signals to the data selection control lines according to the display information; and the providing the data signal corresponding to the display information provided by the data input line to each data line corresponding to the pixel island in the gaze region through the data selection circuits, includes:

providing a first data selection control signal to a plurality of data selection control lines coupled to the first selection switches, to control the f number of first selection switches in each data selection circuit to be turned on sequentially, and transmitting data signals of a data input line coupled to first electrodes of the f number of first selection switches to data lines coupled to second electrodes of the f number of first selection switches; simultaneously, providing a second data selection control signal to a plurality of data selection control lines coupled to the second selection switches, to control the f number of the second selection switches in the each data selection circuit to be turned off.

In some embodiments, each sub-pixel row of the pixel island is divided into a number of sub-pixel groups, wherein, a=h/f, and each sub-pixel group includes f number of adjacent sub-pixels;

when determining that the current display mode is the second display mode, the providing the data selection control signals to the data selection control lines according to the display information; and the providing the data signal corresponding to the display information provided by the data input line to each data line corresponding to the pixel island in the gaze region through the data selection circuits, includes:

when the display information of the each sub-pixel in each sub-pixel group is identical, providing the first data selection control signal to f number of data selection control lines coupled to the first selection switches, to control the f number of first selection switches in each data selection circuit to be turned on simultaneously, and transmitting a data signal of a data input line coupled to the first electrodes of the f number of first selection switches to the data lines coupled to the second electrodes of the f number of first selection switches; simultaneously, providing the second data selection control signal to the f number of data selection control lines coupled to the second selection switches, to control the f number of second selection switches in each data selection circuit to be turned off.

In some embodiments, when determining that the current display mode is the second display mode, the providing the data selection control signals to the data selection control lines according to the display information; and the providing the data signal corresponding to the display information provided by the data input line to each data line corresponding to the pixel island in the gaze region through the data selection circuits, further includes:

in some of the sub-pixel groups, when display information of the first sub-pixel to the (g−1)-th sub-pixel is identical, display information of the g-th sub-pixel to the f-th sub-pixel is identical, and the display information of the (g−1)-th sub-pixel is different from the display information of the g-th sub-pixel, providing the first data selection control signal to data selection control lines coupled to the 1st to the (g−1)-th second selection switches and the g-th to the f-th first selection switches, to control the 1st to the (g−1)-th second selection switches and the g-th to the f-th first selection switches in each data selection circuit to be turned on simultaneously, and transmitting a data signal of a date input line coupled to first electrodes of the 1st to the (g−1)-th second selection switches and first electrodes of the g-th to the f-th first selection switches to data lines coupled to second electrodes of the 1st to the (g−1)-th second selection switches and second electrodes of the g-th to the f-th first selection switches; and simultaneously, providing the second data selection control signal to data selection control lines coupled to the 1st to the (g−1)-th first selection switches and the g-th to the f-th second selection switches, to control the 1st to the (g−1)-th first selection switches and the g-th to the f-th second selection switches in each data selection circuit to be turned off.

In some embodiments, each data selection circuit includes a first multiplexer and a second multiplexer; when determining that the current display mode is the second display mode, the providing the data selection control signals to the data selection control lines according to the display information; and the providing the data signal corresponding to the display information provided by the data input line to each data line corresponding to the pixel island in the gaze region through the data selection circuits, includes:

in some of the sub-pixel groups, when display information of the first sub-pixel to the (g−1)-th sub-pixel is identical, display information of the g-th sub-pixel to the f-th sub-pixel is identical, and the display information of the (g−1)-th sub-pixel is different from the display information of the g-th sub-pixel, providing the first data selection control signal to the plurality of data selection control lines coupled to the first selection switches, to control the 1st to the (g−1)-th first selection switches to be turned on simultaneously, control the g-th to the f-th first selection switches to be turned on simultaneously, and control the 1st to the (g−1)-th first selection switches and the g-th to the f-th first selection switches to be turned on sequentially, and transmitting data signals of a data input line coupled to first electrodes of the f number of first selection switches to data lines coupled to second electrodes of the f number of first selection switches; simultaneously, providing the second data selection control signal to a plurality of data selection control lines coupled to the second selection switches, to control the f number of second selection switches in each data selection circuit to be turned off;

for each data input line, a data signal when the 1st to (g−1)-th first selection switches are turned on is different from a data signal when the g-th to f-th first selection switches are turned on; a data signal of the k-th data input line when the g-th to f-th first selection switches are turned on is identical with a data signal of the (k+1)-th data input line when the 1st to (g−1)-th first selection switches are turned on.

BRIEF DESCRIPTION OF FIGURES

In order to illustrate technical solutions of embodiments of the present application more clearly, drawings needing to be used in descriptions of embodiments will be introduced below briefly. Apparently, the drawings described below are only some embodiments of the present application, and those ordinarily skilled in the art can further obtain other drawings according to these drawings without inventive efforts.

DETAILED DESCRIPTION

Figure 1:
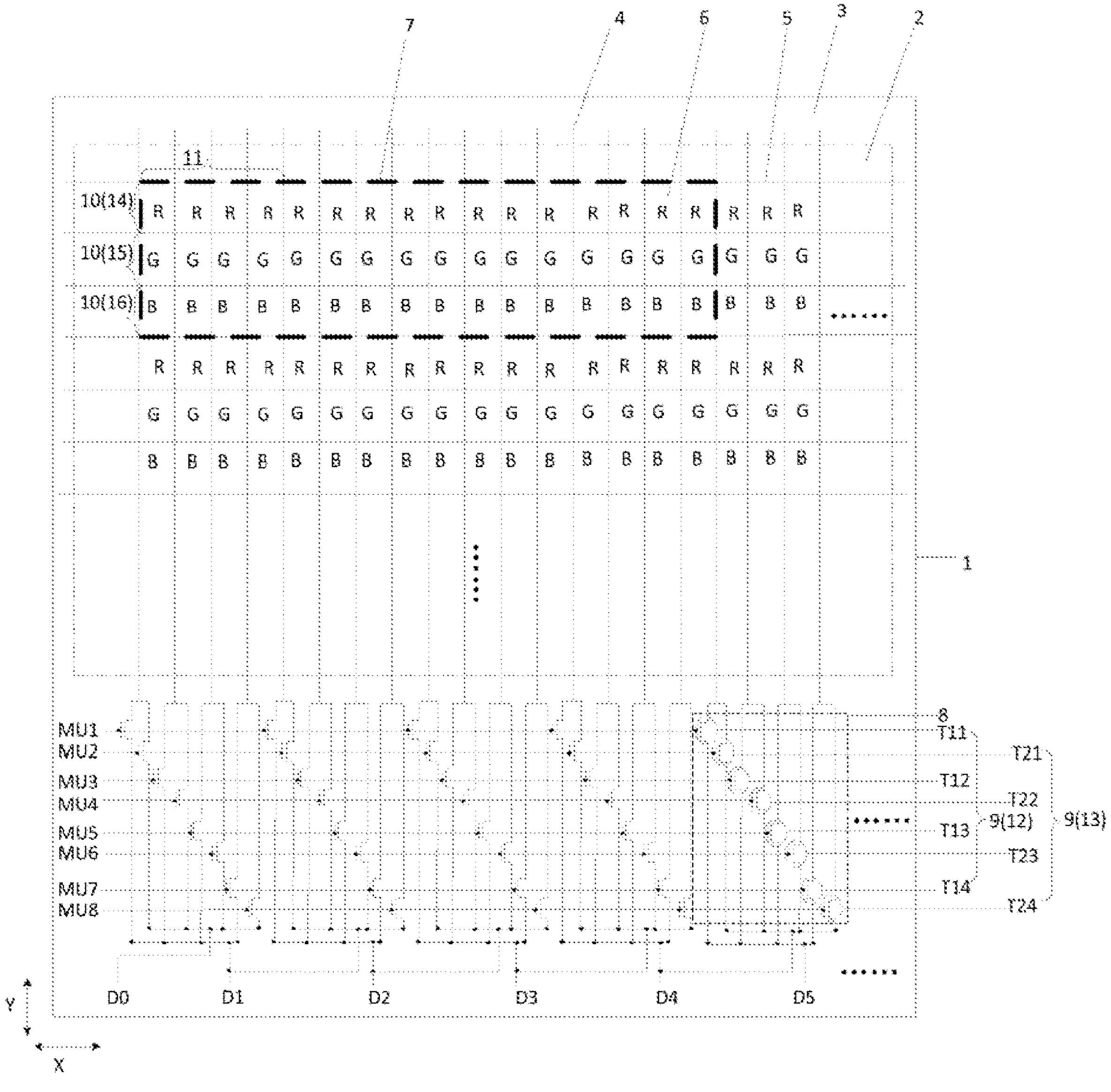
FIG. 1 is a schematic diagram of a display panel according to an embodiment of the present disclosure.

In order to make the purpose, technical solutions and advantages of embodiments of the present disclosure clearer, the technical solutions of embodiments of the present disclosure will be clearly and completely described below in conjunction with drawings of embodiments of the present disclosure. Apparently, the described embodiments are parts of embodiments of the present disclosure, not all of embodiments. In addition, embodiments and features of embodiments in the present disclosure can be combined with each other without conflict. Based on embodiments of the present disclosure, all other embodiments obtained by those ordinarily skilled in the art without creative work shall fall within the protection scope of the present disclosure.

Unless otherwise defined, technical or scientific terms used in the present disclosure shall have the ordinary meanings as understood by those with ordinary skills in the art to which the present disclosure belongs. "First", "second" and similar words used in the present disclosure do not indicate any order, quantity or importance, but are only used to distinguish different components. "Comprise" or "include" or other similar words mean that the element or item appearing before the word encompasses the element or item listed after the word and its equivalents, but does not exclude other elements or items. "Connecting" or "connected" or similar words are not limited to physical or mechanical connections, but may include electrical connections, whether direct or indirect.

It should be noted that the dimensions and shapes of the figures in the drawings do not reflect the real scale, and are only intended to illustrate the present disclosure. In addition, the same or similar reference numerals refer to the same or similar elements or elements having the same or similar functions throughout.

Embodiments of the present disclosure provide a display panel, as shown in FIG. 1, the display panel includes:

- a base substrate 1, including a display region 2 and a peripheral region 3 arranged outside the display region 2;
- a plurality of data lines 4, located at a side of the base substrate 1, and extending from the display region 2 to the peripheral region 3; each of the plurality of data line 4 extends along a first direction Y, and the plurality of data lines 4 are arranged along a second direction X; and the first direction Y intersects with the second direction X;
- a plurality of scan lines 5, located at a same side of the base substrate 1 as the plurality of data lines 4; the scan lines 5 extend along the second direction X, and the plurality of scan lines 5 are arranged along the first direction Y;
- a plurality of sub-pixels 6, respectively located at regions defined by the plurality of scan lines 5 and the plurality of data lines 4; at least two sub-pixels 6 adjacent in the first direction Y and the second direction X form a pixel island 7; and color of light emitted by any two adjacent sub-pixels 6 in the second direction X is identical;
- a plurality of data selection control lines MU, arranged at the peripheral region 3 and located at the same side of the base substrate 1 as the data lines 4;
- a plurality of data input lines D, located at the same side of the base substrate 1 as the data selection control lines MU in the peripheral region 3;
- a plurality of data selection circuits 8, arranged at the peripheral region 3 and located at the same side of the base substrate 1 as the data selection control lines MU; each data selection circuit 8 includes at least two multiplexers 9; in each data selection circuit 8, input terminals of different multiplexers 9 are coupled to different data input lines D, control terminals of different multiplexers 9 are coupled to different data selection control lines MU, and the i-th output terminals of different multiplexers 9 are coupled to a same data line 4; i is a positive integer; in two adjacent data selection circuits 8, two multiplexers 9 coupled to different data selection control lines MU are coupled to a same data input line D; and each of the data selection circuits 8 is configured to: under control of the signals of the plurality of data selection control lines MU, respectively provide a signal of a corresponding data input line D to each coupled data line 4.

The display panel according to embodiments of the present disclosure uses the data selection circuits to provide signals of the data input lines to the data lines, so that the number of data input lines is smaller than the number of data lines, thereby reducing the amount of data input. In addition, each data selection circuit in the display panel according to embodiments of the present disclosure includes at least two multiplexers, and different multiplexers in each data selection circuit are coupled to different data input lines. In this way, for one data selection circuit, under the control of the signals of the plurality of data selection control lines, a signal of a same data input line may be respectively provided to each coupled data line, or signals of different data input lines may also be respectively provided to corresponding data lines through different multiplexers. That is, the plurality of data lines connected with the same data selection circuit may be input with the same data signal, or may be input with data signals that are not exactly the same. When a plurality of sub-pixels in a same row of each pixel island need to be combined for display, if the positions of the human eyes change, the sub-pixels combined for display are also changed. By using the data selection circuits of the display panel according to embodiments of the present disclosure, the display information of the sub-pixels combined for display is changed accordingly, and the display information of the sub-pixels can be smoothly transitioned with the movement of human eyes, thereby improving the display effect and user experience.

It should be noted that only a portion of data lines, a portion of scan lines, a portion of sub-pixels, a portion of data input lines and a portion of data selection circuits are shown in FIG. 1. In FIG. 1, the first direction Y intersects with the second direction X.

In some embodiments, as shown in FIG. 1, the pixel island 7 includes a plurality of sub-pixel rows 10 arranged along the first direction Y; each sub-pixel row 10 includes: h number of sub-pixels 6 arranged along the second direction X; each sub-pixel row 10 is divided into a sub-pixel groups 11, each sub-pixel group 11 includes f number of sub-pixels 6, where a=h/f, a, h, f are all positive integers greater than 1.

In a sub-pixel row 10, each sub-pixel group 11 is coupled to a data selection circuit 8 through the data lines 4, and different sub-pixel groups 11 are coupled to different data selection circuits 8 through the data lines 4.

Each multiplexer 9 includes f number of output terminals, f number of input terminals and f number of control terminals.

In this way, for each sub-pixel group in a sub-pixel row, under the control of the signals of plurality of data selection control lines, a signal of the same data input line can be respectively provided to each data line coupled to the same data input line through a data selection circuit corresponding to the same data input line, or signals of different data input lines can be respectively provided to data lines coupled to the different data input lines through data selection circuits corresponding to the different data input lines. That is, respective sub-pixels in a sub-pixel group may be input with the same display information through the data selection circuit, or may be input with display information that are incompletely the same through the data selection circuits.

It should be noted that, in specific implementation, the sub-pixels are coupled to the scan lines and the data lines, a column of sub-pixels arranged in the first direction Y is coupled to the same data line, and a row of sub-pixels arranged in the second direction X is coupled to the same scan line. That is, during specific implementation, a data selection circuit is coupled to a column of sub-pixel groups through f number of data lines.

In some embodiments, the number of data selection circuits is equal to the number of sub-pixel groups arranged in the second direction in a sub-pixel row.

Therefore, the data signals can be provided to the sub-pixel groups in the pixel island corresponding to the data selection circuits through the data selection circuits.

In some embodiments, as shown in FIG. 1, each data selection circuit 8 includes a first multiplexer 12 and a second multiplexer 13;

- the quantity m of the data selection circuits 8 and the quantity n of the data input lines D satisfy: n=m+1; and
- a first multiplexer 12 of the j-th data selection circuit 8 and a second multiplexer 13 of the (j+1)-th data selection circuit 8 are coupled to the j-th data input line Dj; j is a positive integer that less than m.

In a specific implementation, for example, the data input lines D may be numbered from 0, that is, the n number of data input lines are respectively numbered as DO to Dm. As shown in FIG. 1, the leftmost data selection circuit 8 in FIG. 1 is the first data selection circuit, then the first multiplexer 12 of the first data selection circuit 8 and the second multiplexer 13 of the second data selection circuit 8 are coupled to the first data input line D1. During specific implementation, the second multiplexer 13 of the first data selection circuit 8 is coupled to the 0-th data input line DO. The first multiplexer 12 of the m-th data selection circuit 8 is coupled to the m-th data input line Dm.

In some embodiments, as shown in FIG. 1, the first multiplexer 12 includes f number of first selection switches T1; control electrodes of different first selection switches T1 are coupled to different data selection control lines MU; first electrodes of different selection switches T1 are coupled to the same data input line D; second electrodes of different first selection switches T1 are coupled to different data lines 4.

The second multiplexer 13 includes f number of second selection switches T2; control electrodes of different second selection switches T2 are coupled to different data selection control lines MU; first electrodes of different second selection switches T2 are coupled to the same data input line D; second electrodes of different second selection switches T2 are coupled to different data lines 4.

In each data selection circuit 8, the second electrode of the i-th first selection switch T1*i* of the first multiplexer 12 and the second electrode of the i-th second selection switch T2*i* of the second multiplexer 13 are coupled to the same data line 4.

In some embodiments, the first selection switch includes a first transistor; the control electrode of the first transistor is coupled to the data selection control line, the first electrode of the first transistor is coupled to the data input line, and the second electrode of the first transistor coupled with the data line.

The second selection switch includes a second transistor; the control electrode of the second transistor is coupled to the data selection control line, the first electrode of the second transistor is coupled to the data input line, and the second electrode of the second transistor is coupled to the data line.

In specific implementation, both the first transistor and the second transistor may be metal-oxide-semiconductor (MOS) field-effect transistors, complementary metal-oxide-semiconductor (CMOS) transistors, or thin film transistor (TFT).

In some embodiments, the first transistor and the second transistor both are P-type transistors or N-type transistors. In this way, it is convenient to use the data selection control line to control the data selection circuit.

Certainly, it is also possible that one of the first transistor and the second transistor may be a P-type transistor, and the other may be an N-type transistor.

In some embodiments, the display panel includes 2f number of data selection control lines.

The f number of data selection control lines are coupled to control electrodes of first selection switches of first multiplexers, and the remaining f number of data selection control lines are coupled to control electrodes of second selection switches of second multiplexers.

In some embodiments, as shown in FIG. 1, the control electrodes of the i-th first selection switches T1*i* of different data selection circuits 8 are coupled to the same data selection control line MU.

The control electrodes of the i-th second selection switches T2*i* of different data selection circuits are coupled to the same data selection control line MU.

It should be noted that FIG. 1 takes the control electrodes of the i-th first selection switches T1*i* of different data selection circuits coupled to the same data selection control line MU, the control electrodes of the i-th second selection switches T2*i* of different data selection circuits coupled to the same data selection control line MU, and the display panel including 2f number of data selection control lines as an example for illustration. Of course, in specific implementation, the control electrodes of the i-th first selection switches T1*i* of different data selection circuits may also be coupled to the different data selection control lines MU, and the control electrodes of the i-th second selection switches T2*i* of different data selection circuits may also be coupled to different data selection control lines MU. The number of data selection control lines included in the display panel is an integer multiple of 2f.

In some embodiments, as shown in FIG. 1, the pixel island 7 includes: a first sub-pixel row 14, a second sub-pixel row 15 and a third sub-pixel row 16 arranged along the first direction Y;

- the first sub-pixel row 14 includes a plurality of sub-pixels with first color arranged along the second direction;
- the second sub-pixel row 15 includes a plurality of sub-pixels with second color arranged along the second direction; and the third sub-pixel row 16 includes a plurality of sub-pixels with third color arranged along the second direction.

In some embodiments, as shown in FIG. 1, the sub-pixels with first color are red sub-pixels R, the sub-pixels with second color are green sub-pixels G, and the sub-pixels with third color are blue sub-pixels B.

In some embodiments, as shown in FIG. 1, each sub-pixel row 10 in the pixel island 7 includes 16 number of sub-pixels 6; each sub-pixel row 10 is divided into 4 number of sub-pixel groups 11, each sub-pixel group 11 includes 4 number of sub-pixels 6;

each multiplexer 9 includes 4 number of input terminals, 4 number of control terminals and 4 number of output terminals.

Next, the display panel according to embodiments of the present disclosure will be illustrated by taking each sub-pixel group including 4 sub-pixels as an example.

In a specific implementation, as shown in FIG. 1, the first multiplexer 12 includes 4 number of first selection switches, namely T11, T12, T13 and T14. The second multiplexer 13 includes 4 number of second selection switches, namely T21, T22, T23 and T24.

During specific implementation, as shown in FIG. 1, the display panel includes 8 number of data selection control lines MU, namely MU1, MU2, MU3, MU4, MUS, MU6, MU7 and MU8. The control electrode of the first first selection switch T11 in each data selection circuit 8 is coupled to MU1, the control electrode of the first second selection switch T21 in each data selection circuit 8 is coupled to MU2, the control electrode of the second first selection switch T12 in each data selection circuit 8 is coupled to MU3, the control electrode of the second second selection switch T22 in each data selection circuit 8 is coupled to MU4, and the control electrode of the third first selection switch T13 in each data selection circuit 8 is coupled to MUS, the control electrode of the third second selection switch T23 in each data selection circuit 8 is coupled to MU6, and the control electrode of the fourth first selection switch T14 in each data selection circuit 8 is coupled to MU7, and the control electrode of the fourth second selection switch T24 in each data selection circuit 8 is coupled to MU8.

During specific implementation, as shown in FIG. 1, in each data selection circuit 8, the second electrode of the first first selection switch T11 and the second electrode of the first second selection switch T21 are coupled to the same data line 4, the second electrode of the second first selection switch T12 and the second electrode of the second second selection switch T22 are coupled to the same data line 4, the second electrode of the third first selection switch T13 and the second electrode of the third second selection switch T23 are coupled to the same data line 4, and the second electrode of the fourth first selection switch T14 and the second electrode of the fourth second selection switch T24 are coupled to the same data line 4.

During specific implementation, as shown in FIG. 1, in each data selection circuit 8, the first electrodes of the first selection switches T11, T12, T13 and T14 are coupled to the same data input line D, and the first electrodes of the second selection switches T21, T22, T23 and T24 are coupled to the same data input line D, and the first electrodes of the first selection switches T11, T12, T13 and T14 and the first electrodes of the second selection switches T21, T22, T23, T24 are coupled to different from data input lines D. For example, in the first data selection circuit 8 from left to right in FIG. 1, the first electrodes of the first selection switches T11, T12, T13 and T14 are coupled to D1, and first electrodes of the second selection switches T21, T22, T23 and T24 are coupled to DO. In the second data selection circuit 8, the first electrodes of the first selection switches T11, T12, T13 and T14 are coupled to D2, and the first electrodes of the second selection switches T21, T22, T23 and T24 are coupled to D1. In the third data selection circuit 8, the first electrodes of the first selection switches T11, T12, T13 and T14 are coupled to D3, and the first electrodes of the second selection switches T21, T22, T23 and T24 are coupled to D2. And so on, no more details here.

It should be noted that, during specific implementation, the viewpoint needs to correspond to the red sub-pixel, the blue sub-pixel and the green sub-pixel. Next, taking a sub-pixel row of a pixel island including 16 sub-pixels as an example, the correspondence between sub-pixels and viewpoints will be illustrated.

Figure 2:
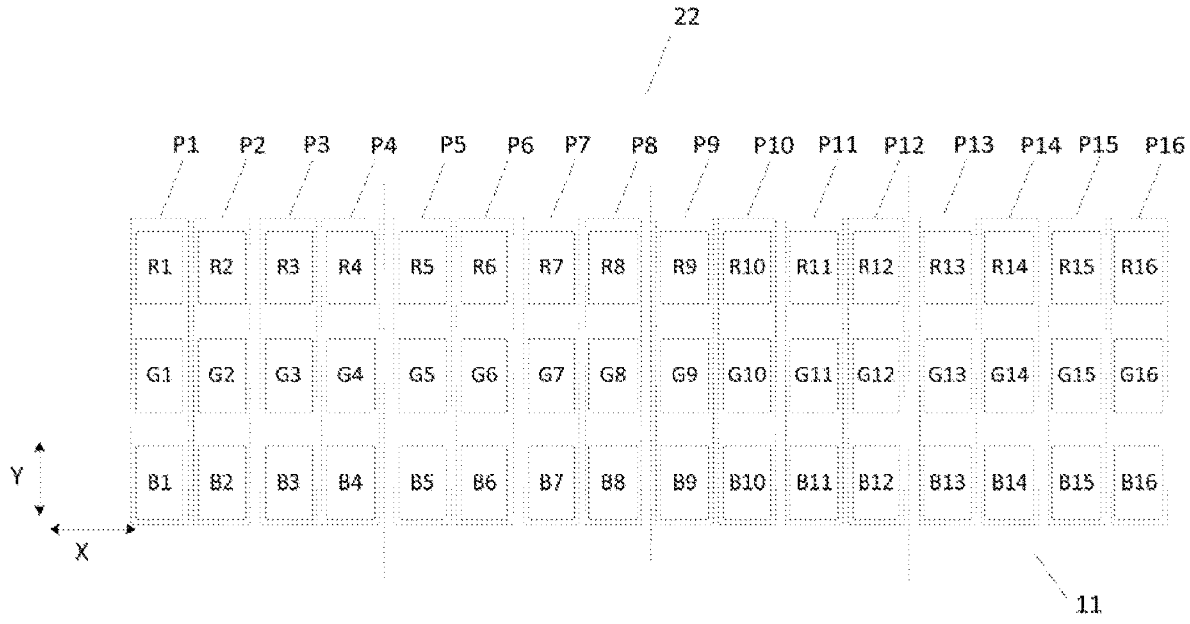
FIG. 2 is a schematic diagram of a correspondence between sub-pixels and viewpoints in a pixel island of a display panel according to an embodiment of the present disclosure.

When a pixel island corresponds to 16 number of viewpoints, sub-pixels in each sub-pixel group in the same row in the pixel island need to display different display information. In some display cases, for example, it can be as shown in FIG. 2, the i-th viewpoint Pi corresponds to Ri, Gi and Bi of the first pixel island 22, where i is a positive integer less than or equal to 16. Take the coupling between the first pixel island and the first four data selection circuits arranged from left to right in FIG. 1 as an example for illustration, during specific implementation, the first selection switches T11, T12, T13 and T14 in the data selection circuits can be controlled to be turned on in turn through the data selection control lines Mill, MU3, MU5 and MU7, and the data signals corresponding to the viewpoints Pi to P4*i* are sequentially provided through Di, and simultaneously, the second selection switches T21, T22, T23 and T24 in the data selection circuits can be controlled to be turned off through the data selection control lines MU2, MU4, MU6 and MU8.

Figure 3:
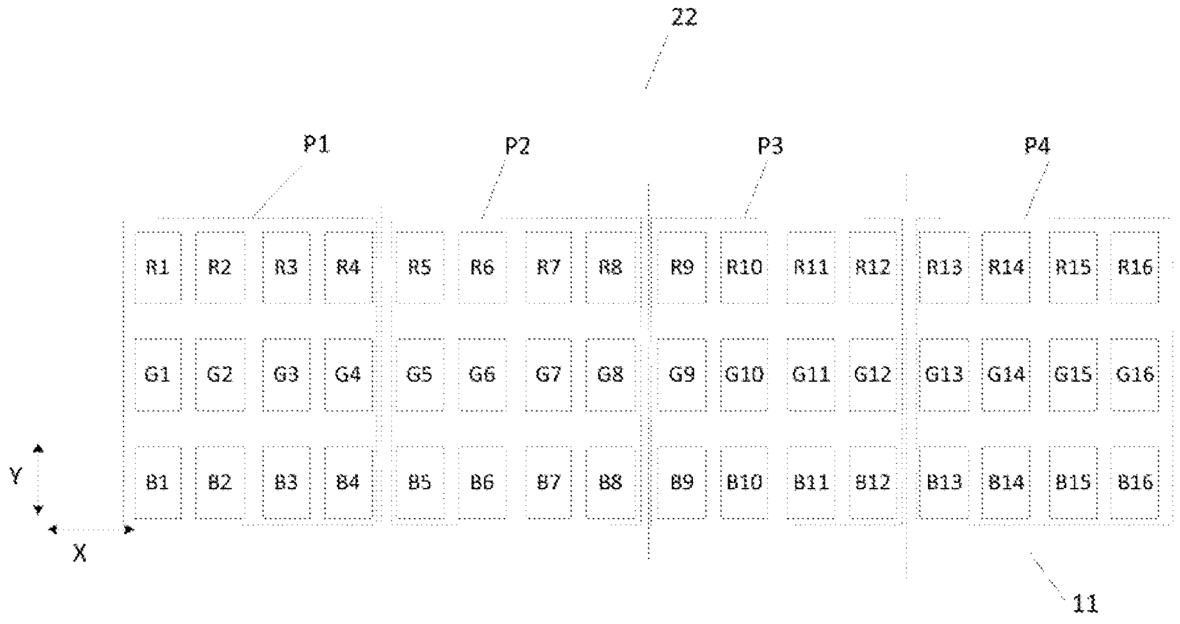
FIG. 3 is another schematic diagram of a correspondence between sub-pixels and viewpoints in a pixel island of a display panel according to an embodiment of the present disclosure.

When one pixel island corresponds to 4 number of viewpoints, that is, four sub-pixels of each row in the pixel island are combined for display. In some display cases, for example, as shown in FIG. 3, the i-th viewpoint Pi corresponds to R4*i*-3~R4*i*, G4*i*-3~G4*i* and B4*i*-3~B4*i* of the first pixel island 22, where i is a positive integer less than or equal to 4. In specific implementation, the first selection switches T11, T12, T13 and T14 in the data selection circuits can be controlled to be turned on simultaneously through the data selection control lines MU1, MU3, MU5 and MU7, and the data signals corresponding to the viewpoint Pi can be sequentially provided through Di, and simultaneously, the second selection switches T21, T22, T23, T24 in the data selection circuits are controlled to be turned off through the data selection control lines MU2, MU4, MU6, MU8.

Figure 4:
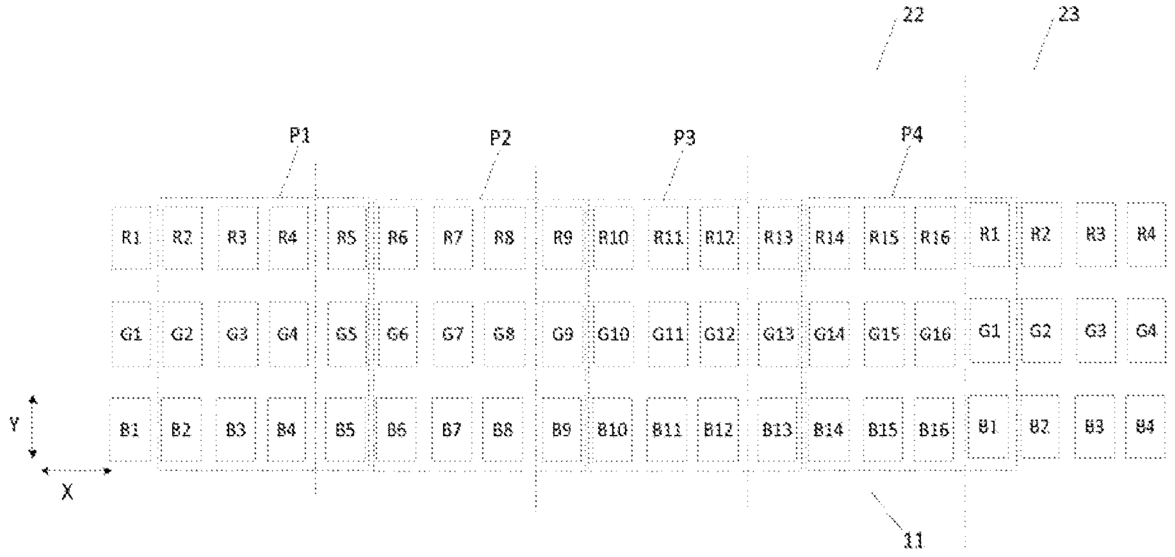
FIG. 4 is another schematic diagram of a correspondence between sub-pixels and viewpoints in a pixel island of a display panel according to an embodiment of the present disclosure.

In some display situations, for example, when the user's eyes move, the sub-pixels corresponding to the viewpoints are shifted to the right in FIG. 3. When one sub-pixel is shifted, the correspondence between the sub-pixels and the viewpoint in the user's gaze region may be as shown in FIG. 4, the first viewpoint P1 corresponds to R2-R5, G2-G5 and B2-B5 of the first pixel island 22, and the second viewpoint P2 corresponds to R6-R9, G6-G9 and B6-B9 of the first pixel island 22, the third viewpoint P3 corresponds to R10-R13, G10-G13 and B10-B13 of the first pixel island 22, and the fourth viewpoint P4 corresponds to R14-R16, G14-G16 and B14-B16 of the first pixel island 22 and R1, G1, B1 of the second pixel island 23. In a specific implementation, the sub-pixels in a sub-pixel group may be input with data signals that are not completely the same by only using the first selection switches in the data selection circuit. For example, data signals d4 and d1 are sequentially input to DO, data signals d1 and d2 are sequentially input to D1, data signals d2 and d3 are sequentially input D2, data signals d3 and d4 are sequentially input to D3, and data signals d4 and d1 are sequentially input to D4. A first data selection control signal is provided to MU1, and then the first data selection control signal is provided to MU3, MU5 and MU7 simultaneously to control T11 in each data selection circuit to be turned on first, and then control T12, T13 and T14 to be turned on simultaneously. A second data selection control signal is provided simultaneously to MU2, MU4, MU6, and MU8 to control the four second selection switches T21, T22, T23 and T24 in each data selection circuit to be turned off. Alternatively, the first selection switches and the second selection switches in the data selection circuit can also be used to input data signals that are not exactly the same to the sub-pixels in one sub-pixel group. For example, the data signal d4 is input to DO, the data signal d1 is input to D1, the data signal d2 is input to D2, the data signal d3 is input to D3, and the data signal d4 is input to D4. A first data selection control signal is simultaneously provided to MU2, MU3, MU5 and MU7 to control T21, T12, T13 and T14 in each data selection circuit to be turned on simultaneously. A second data selection control signal is simultaneously provided to Mill, MU4, MU6 and MU8 to control T11, T22, T23 and T24 in each data selection circuit to be turned off.

Figure 5:
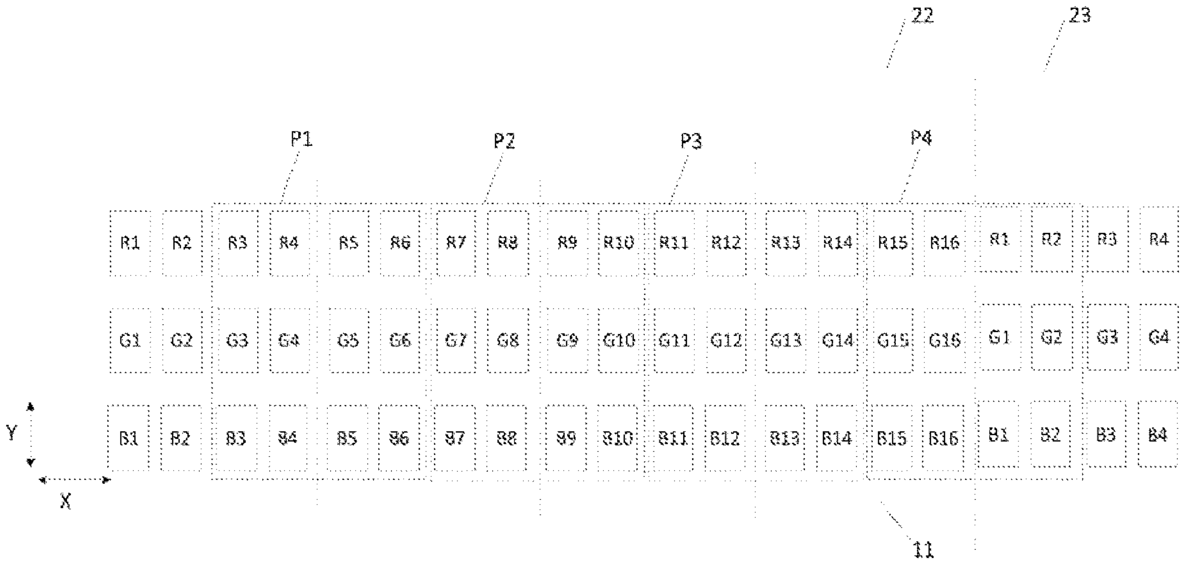
FIG. 5 is another schematic diagram of a correspondence between sub-pixels and viewpoints in a pixel island of a display panel according to an embodiment of the present disclosure.

In some display situations, for example, the user's eyes continue to move, causing the sub-pixels corresponding to the viewpoints to shift one sub-pixel again to the right of FIG. 4. The correspondence between the sub-pixels and the viewpoints in the user's gaze region may be as shown in FIG. 5, the first viewpoint P1 corresponds to R3-R6, G3-G6 and B3-B6 of the first pixel island 22, the second viewpoint P2 corresponds to R7-R10, G7-G10 and B7-B10 of the first pixel island 22, the third viewpoint P3 corresponds to R11-R14, G11-G14 and B11-B14 of the first pixel island 22, and the fourth viewpoint P4 corresponds to R15-R16, G15-G16 and B15-B16 of the first pixel island 22 and R1, R2, G1, G2, B1 and B2 of the second pixel island 23. In a specific implementation, it is possible to utilize only the first selection switches in the data selection circuit to enable sub-pixels in a sub-pixel group to be input with data signals that are not exactly the same. The data signals d4 and d1 are sequentially input to DO, the data signals d1 and d2 are sequentially input to D1, the data signals d2 and d3 are sequentially input to D2, the data signals d3 and d4 are sequentially to input to D3, and the data signals d4 and d1 are sequentially input to D4. The first data selection control signal is provided to MU1 and MU3 simultaneously, and then the first data selection control signal is provided to MU5 and MU7 simultaneously to control T11 and T12 in each data selection circuit to be turned on simultaneously first, and then control T13 and T14 to be turned on simultaneously. The second data selection control signal is simultaneously provided to MU2, MU4, MU6 and MU8 to control the four second selection switches T21, T22, T23 and T24 in each data selection circuit to be turned off. Alternatively, the first selection switches and the second selection switches in the data selection circuit can also be used to input data signals that are not exactly the same to the sub-pixels in one sub-pixel group. For example, the data signal d4 is input to DO, the data signal d1 is input to D1, the data signal d2 is input to D2, the data signal d3 is input to D3, and the data signal d4 is input to D4. The first data selection control signal is simultaneously provided to MU2, MU4, MU5 and MU7 to control T21, T22, T13 and T14 in each data selection circuit to be turned on simultaneously. The second data selection control signal is simultaneously provided to MU1, MU3, MU6 and MU8 to control T11, T12, T23 and T24 in each data selection circuit to be turned off.

In a specific implementation, the display panel may be a rigid display panel, or a flexible display panel, that is, the display panel is bendable and foldable.

In some embodiments, the display panel according to embodiments of the present disclosure is a liquid crystal display panel. The type of the liquid crystal display panel may be a Twisted Nematic (TN) type, a Vertical Alignment (VA) type, an In-Plane Switching (IPS) type or an Advanced Super Dimension Switch (ADS) type and other LCD panels.

In some embodiments, the liquid crystal display panel includes: an array substrate and an opposite substrate disposed opposite to each other, and a liquid crystal layer located between the array substrate and the opposite substrate. In a specific implementation, the scan lines, the data lines, the data selection control lines, the data input lines and the data selection circuits can be arranged on the array substrate. The array substrate further includes: a plurality of driving transistors corresponding to the sub-pixels one by one, and a plurality of pixel electrodes electrically connected with the driving transistors in a one-to-one correspondence. The opposite substrate includes a black matrix and a color filter. Control electrodes of the driving transistors are electrically connected with the scan lines, first electrodes of the driving transistors are electrically connected with the data lines, and second electrodes of the driving transistors are electrically connected with the pixel electrodes. In some embodiments, the black matrix shields the scan lines and the data lines, and an opening region of the black matrix is provided with a color filter corresponding to the color of the sub-pixel. In some embodiments, when a row of sub-pixels arranged in the second direction X have the same color, the black matrix may also be set only to block the scan lines. In some embodiments, the liquid crystal display panel further includes a common electrode layer, and the common electrode layer may be disposed at the array substrate or at the opposite substrate.

In some embodiments, the display panel according to embodiments of the present disclosure is an electroluminescent display panel. The electroluminescence display panel may be, for example, an organic light-emitting diode (OLED) display panel, a quantum dot light-emitting diode (QLED) display panel, and the like. In a specific implementation, each sub-pixel includes, for example, a pixel driving circuit and an electroluminescent device electrically connected to the pixel driving circuit, and the pixel driving circuit includes, such as, a transistor, a capacitor, and the like.

Figure 6:
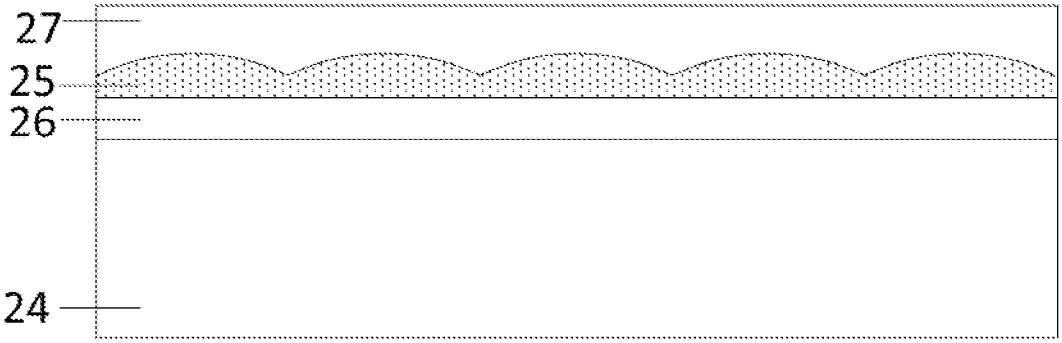
FIG. 6 is a schematic structural diagram of a display device according to an embodiment of the present disclosure.

Based on the same inventive concept, embodiments of the present disclosure further provide a display device, as shown in FIG. 6, including the display panel 24 according to embodiments of the present disclosure.

In some embodiments, as shown in FIG. 6, the display device further includes:

- a lenticular lens structure 25, located at a light emitting side of the display panel; the lenticular lens structure includes a plurality of lenticular lenses arranged in an array. In some embodiments, as shown in FIG. 6, the display device further includes:
- a light-transmitting spacer layer 26, located between the display panel 24 and the lenticular lens structure 25; and
- a planarization layer 27, located at a side of the lenticular lens structure 25 away from the light-transmitting spacer layer 26.

In some embodiments, when the display panel is a liquid crystal display panel, the display device, for example, further includes a backlight module located at a side of the display panel away from the lenticular lens structure.

In some embodiments, the display device also includes:

a human eye-tracking system, configured to determine a gaze region of user's eyes on the display device in real time.

In this way, the display information of each sub-pixel of the pixel island corresponding to the gaze region can be determined according to the determined gaze region of the user's eyes on the display device.

In a specific implementation, due to that the sub-pixel subdivision is performed within the pixel island (i.e. a pixel that can be used as a two-dimensional image (2D) display), the same resolution as 2D display can be maintained in the three-dimensional image (3D) display mode, and combined with eye-tracking to realize multi-viewpoint (view) display with large viewing angle and 3D display with higher pixel density (ppi), the amount of information is larger, and the color crosstalk between adjacent viewpoints is lower, and it can also reduce the feeling of dizziness when watching 3D images and improve user experience. When the display device is provided with a lenticular lens array, the lenticular lens array can not only perform pixel mapping on the sub-pixels of the pixel island, but also modulate of light field of the emergent light of the pixel island, so that the final emergent light of the pixel island can form multiple viewpoints, to realize the 3D display of light field.

The display device according to embodiments of the present disclosure is any product or component with a display function, such as a mobile phone, a tablet computer, a television, a display, a notebook computer, a digital photo frame, and a navigator. Other essential components of the display device should be understood by those of ordinary skilled in the art, and will not be repeated here, nor should they be used as limitations on the present disclosure. The implementation of the display device can refer to embodiments of the display panel mentioned above, and the repetitions are not described.

Figure 7:
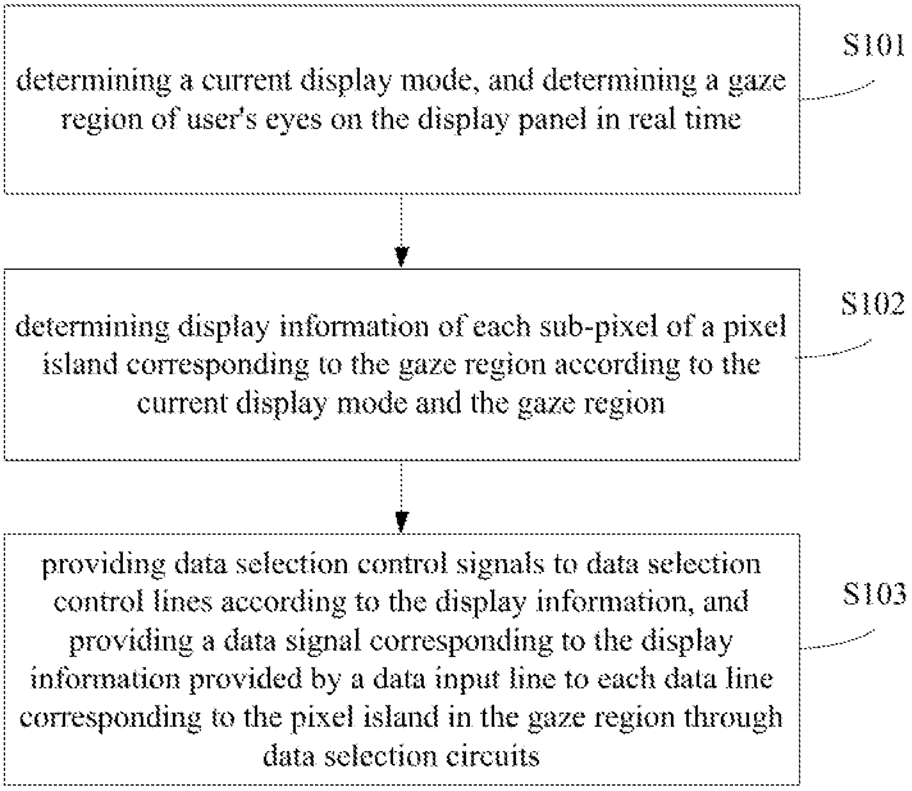
FIG. 7 is a schematic flow diagram of a method for driving a display device according to an embodiment of the present disclosure.

Based on the same inventive concept, embodiments of the present disclosure also provide a method for driving the above display device, as shown in FIG. 7, including:

S101, determining a current display mode, and determining a gaze region of user's eyes on the display panel in real time;

S102, determining display information of each sub-pixel of a pixel island corresponding to the gaze region according to the current display mode and the gaze region;

S103, providing data selection control signals to data selection control lines according to the display information, and providing a data signal corresponding to the display information provided by a data input line to each data line corresponding to the pixel island in the gaze region through data selection circuits.

In the method for driving the display device according to embodiments of the present disclosure, under the control of the signals of a plurality of data selection control lines, the signal of the same data input line can be respectively provided to each coupled data line by using the data selection circuit, or signals of different data input lines may also be respectively provided to corresponding data lines through different multiplexers. When a plurality of sub-pixels in the same row of each pixel island need to be combined for display, and when the positions of the human eye change, the sub-pixels combined for display are also changed. After determining the display information corresponding to each sub-pixel, even if the sub-pixels combined for display are changed, the display information of the sub-pixels combined for display can also be changed through the data selection circuits, which can make the display information of the sub-pixels transition smoothly with the movement of human eyes, to improve the display effect and enhance the user experience.

In some embodiments, in S101, the determining the gaze region of the user's eyes on the display panel in real time, includes:

acquiring the gaze region of the user's eyes on the display panel through a human eye tracking system.

In S102, the determining the display information of each sub-pixel of the pixel island corresponding to the gaze region according to the current display mode and the gaze region, including:

determining view information viewed by the user according to the current display mode and the gaze region of the user's eyes on the display panel; and determining a target sub-pixel in a pixel island corresponding to the view information according to the view information, and determining display information of the target sub-pixel corresponding to the view information.

In some embodiments, the determining the current display mode includes:

when system resource occupancy of the display device meets a preset condition, determining that the current display mode is a first display mode; and in the first display mode, each sub-pixel in a sub-pixel row of the pixel island corresponds to one viewpoint; and when the system resource occupation of the display device does not meet the preset condition, determining that the current display mode is a second display mode; in the second display mode, f number of adjacent sub-pixels in a sub-pixel row of the pixel island correspond to one viewpoint; the sub-pixel row of the pixel island includes h number of sub-pixels, h/f is a positive integer; both h and f are positive integers greater than 1.

During specific implementation, if the system resource occupancy of the display device meets the preset condition, the system resource of the display device is sufficient; if the system resource occupancy of the display device does not meet the preset condition, the system resource of the display device is insufficient.

In some embodiments, each data selection circuit includes a first multiplexer and a second multiplexer, the first multiplexer includes f number of first selection switches, and the second multiplexer includes f number of second selection switches.

When it is determined that the current display mode is the first display mode, the providing the data selection control signals to the data selection control lines according to the display information, and the providing the data signal corresponding to the display information provided by the data input line to each data line corresponding to the pixel island in the gaze region through the data selection circuits, includes:

providing a first data selection control signal to a plurality of data selection lines coupled to the first selection switches, to control the f number of first selection switches in each data selection circuit to be turned on sequentially, and transmitting data signals of a data input line coupled to first electrodes of the f number of first selection switches to data lines coupled to second electrodes of the f number of first selection switches; simultaneously, providing a second data selection control signal to a plurality of data selection control lines coupled to the second selection switches, to control the f number of second selection switches in each data selection circuit to be turned off.

In some embodiments, when the first transistor in the first selection switch and the second transistor in the second selection switch are of the same type, the first data selection control signal that controls the selection switch to be turned on is a high level signal, the second data selection control signal that controls the selection switch to be turned off is a low-level signal, or the first data selection control signal that controls the selection switch to be turned on is a low-level signal, and the second data selection control signal that controls the selection switch to be turned off is a high level signal.

Figure 8:
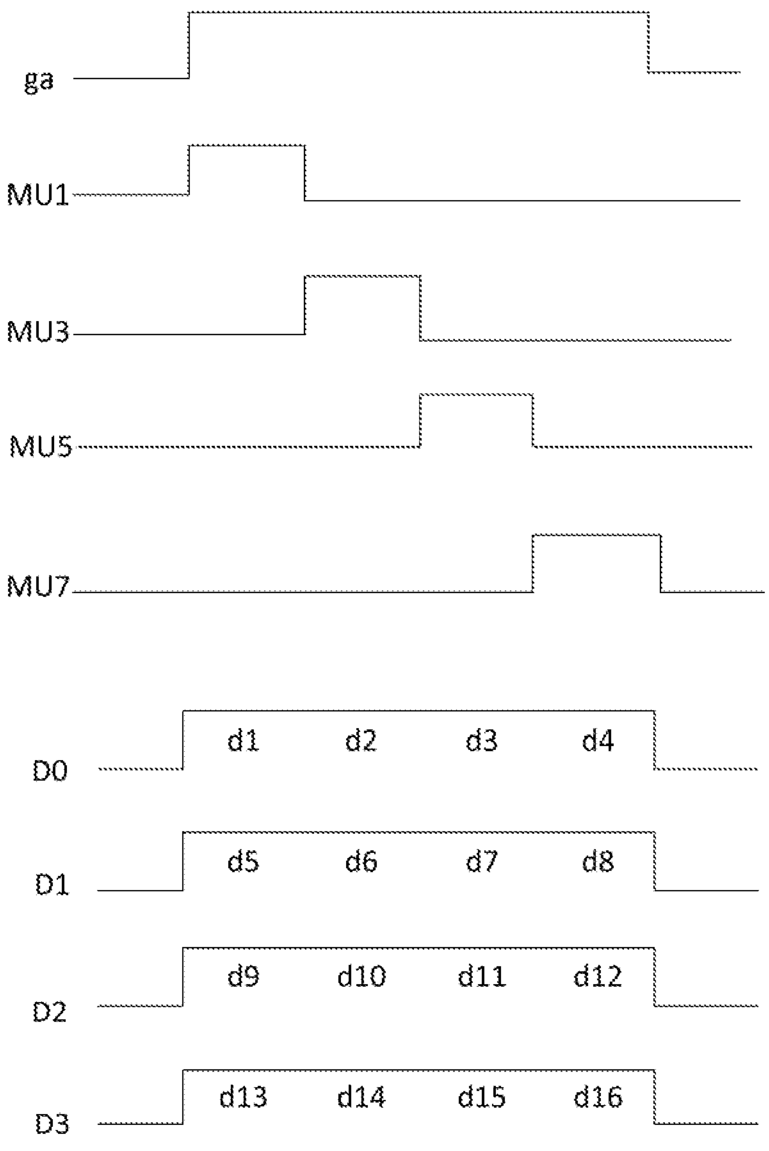
FIG. 8 is a timing sequence diagram of a method for driving a display device according to an embodiment of the present disclosure.

In specific implementation, taking the display panel shown in FIG. 1 as an example, when it is determined that the current display mode is the first display mode, the corresponding timing diagram is shown in FIG. 8, and MU1, MU3, MU5 and MU7 are sequentially provided with the first data selection control signal to control the four first selection switches T11, T12, T13 and T14 in each data selection circuit 8 to be turned on sequentially. MU2, MU4, MU6 and MU8 are simultaneously provided with the second data selection control signal to control the four second selection switches T21, T122, T23 and T24 in each data selection circuit 8 to be turned off. In this way, for the data selection circuits 8 arranged in sequence from left to right, the first data selection circuit 8 inputs the data signal input by DO to the corresponding data lines through the first selection switches T11, T12, T13 and T14, and the second data selection circuit 8 inputs the data signal input by D1 to the corresponding data lines through the first selection switches T11, T12, T13 and T14, and the third data selection circuit 8 inputs the data signal input by D2 to the corresponding data lines through the first selection switch T11, T12, T13 and T14, and the fourth data selection circuit 8 inputs the data signal input by D3 to the corresponding data lines through the first selection switches T11, T12, T13 and T14. In a specific implementation, one pixel island in FIG. 1 corresponds to 16 number of viewpoints, and the correspondence between viewpoints P and sub-pixels can be as shown in FIG. 2, for example, in FIG. 8, di represents the data signal corresponding to the display information of the i-th viewpoint Pi in the pixel island. That is, the data signals d1-d4 are sequentially input to DO, the data signals d5-d8 are sequentially input to D1, the data signals d9-d12 are sequentially input to D2, and the data signals d13-d16 are sequentially input to D3. The signal ga in FIG. 8 is the signal input by the scan line.

In some embodiments, each sub-pixel row in the pixel island is divided into a number of sub-pixel groups, where a=h/f, and each sub-pixel group includes f number of adjacent sub-pixels.

When it is determined that the current display mode is the second display mode, the providing the data selection control signals to the data selection control lines according to the display information, and the providing the data signal corresponding to the display information provided by the data input line to each data line corresponding to the pixel island in the gaze region through the data selection circuits, includes:

when the display information of the sub-pixels in each sub-pixel group is identical, providing a first data selection control signal to the f number of data selection lines coupled to the first selection switches, to control the f number of first selection switch in each data selection circuit to be turned on simultaneously, and transmitting the data signal of the data input line coupled to the first electrodes of the f number of first selection switches to the data lines coupled to the second electrodes of the f number of first selection switches; and simultaneously, providing a second data selection control signal to the f number of data selection lines coupled to the second selection switches, to control the f number of second selection switches in each data selection circuit to be turned off.

Figure 9:
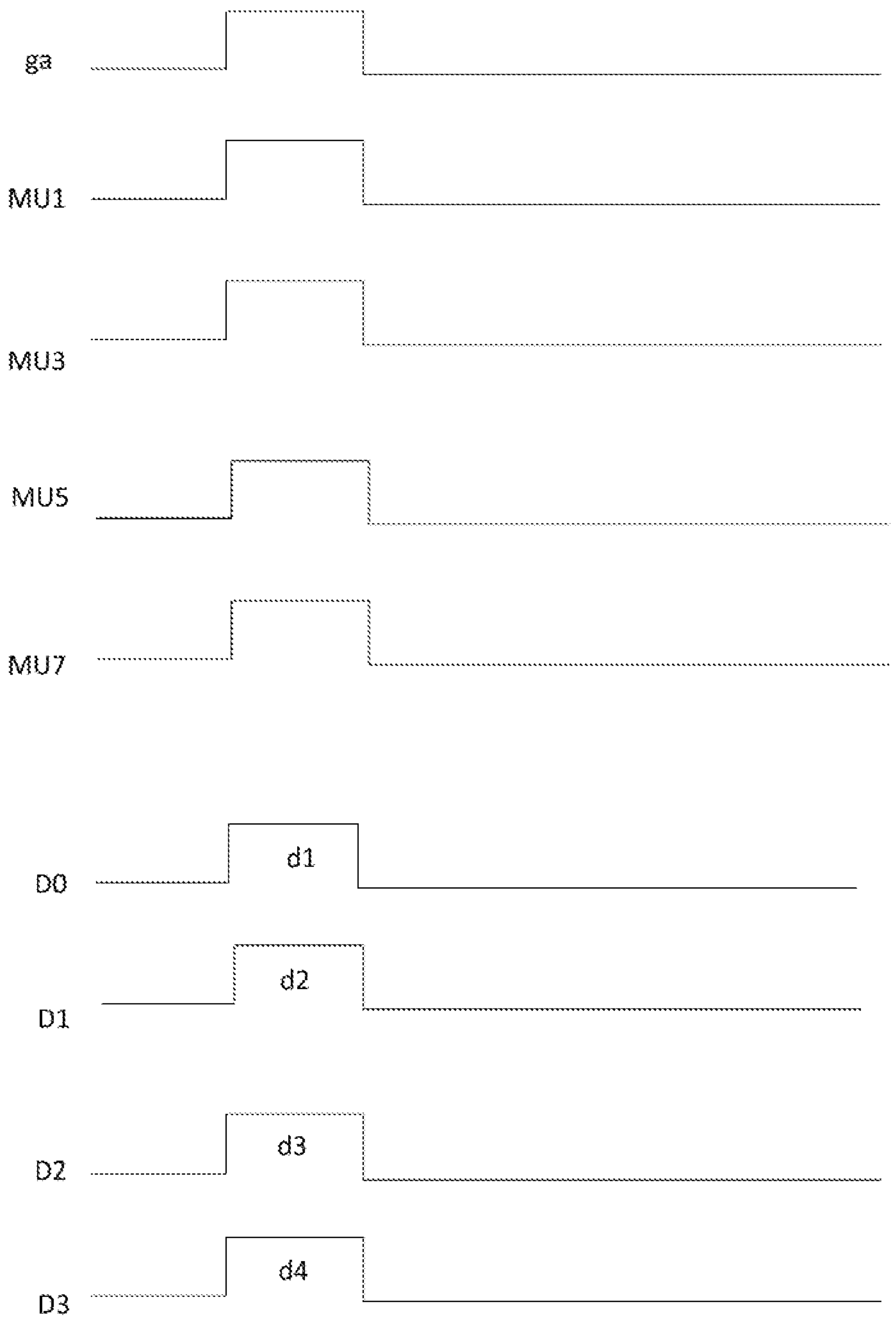
FIG. 9 is another timing sequence diagram of a method for driving a display device according to an embodiment of the present disclosure.

In specific implementation, taking the display panel shown in FIG. 1 as an example, when it is determined that the current display mode is the second display mode, that is, four adjacent sub-pixels in FIG. 1 correspond to one viewpoint, that is, four adjacent sub-pixels are combined for display, when the display information of sub-pixels in each sub-pixel group is identical, the correspondence between the viewpoints P and the sub-pixels may be as shown in FIG. 3, and the corresponding timing diagram is shown in FIG. 9. The first data selection control signal is simultaneously provided to MU1, MU3, MU5 and MU7, to control four first selection switches T11, T12, T13 and T14 in each data selection circuit 8 to be turned on simultaneously, and the second data selection control signal is simultaneously provided to MU2, MU4, MU6 and MU8, to control the four second selection switches T21, T22, T23 and T24 in each data selection circuit 8 to be turned off. In this way, for the data selection circuits 8 arranged in sequence from left to right, the first data selection circuit 8 inputs the data signal input by DO to the corresponding data lines through the first selection switches T11, T12, T13 and T14, and the second data selection circuit 8 inputs the data signal input by D1 to the corresponding data lines through the first selection switches T11, T12, T13 and T14, and the third data selection circuit 8 inputs the data signal input by D2 to the corresponding data lines through the first selection switch T11, T12, T13 and T14, and the fourth data selection circuit 8 inputs the data signal input by D3 to the corresponding data lines through the first selection switches T11, T12, T13 and T14. In FIG. 9, di represents the data signal corresponding to the display information of the i-th viewpoint Pi in the pixel island. That is, the data signal d1 is input to DO, the data signal d2 is input to D1, the data signal d3 is input to D2, and the data signal d4 is input to D3.

In some embodiments, each data selection circuit includes a first multiplexer and a second multiplexer; when it is determined that the current display mode is the second display mode, the providing the data selection control signals to the data selection control lines according to the display information, and the providing the data signal corresponding to the display information provided by the data input line to each data line corresponding to the pixel island in the gaze region through the data selection circuits, includes:

in some sub-pixel groups, when display information of the first sub-pixel to the (g−1)-th sub-pixel is identical, display information of the g-th sub-pixel to the f-th sub-pixel is identical, and the display information of the (g−1)-th sub-pixel is different from the display information of the g-th sub-pixel, providing the first data selection control signal to a plurality of data selection lines coupled to the first selection switches, to control the 1st to (g−1)-th first selection switches to be turned on simultaneously, control the g-th to f-th first selection switches to be turned on simultaneously, and control the 1st to (g−1)-th first selection switches and the g-th to f-th first selection switches to be turned on sequentially, and transmitting data signals of a data input line coupled to first electrodes of the f number first selection switches to data lines coupled to second electrodes of the f number of first selection switches; and simultaneously, providing the second data selection control signal to a plurality of data selection lines coupled to the second selection switches, to control the f number second selection switches in each data selection circuit to be turned off;

for each data input line, a data signal when the 1st to (g−1)-th first selection switches are turned on is different from a data signal when the g-th to f-th first selection switches are turned on; a data signal of the k-th data input line when the g-th to f-th first selection switches are turned on is identical with a data signal of the (k+1)-th data input line when the 1st to (g−1)-th first selection switches are turned on.

In the method for driving the display device according to embodiments of the present disclosure, when the positions of the human eyes change, even if the sub-pixels combined for display are also changed, after the display information corresponding to each sub-pixel is determined, the data selection control signals provided by the data selection control lines can be used to control the data selection circuit to change the display information of the sub-pixels combined for display, so that the display information of the sub-pixels can be smoothly transitioned with the movement of the human eyes, to improve the display effect and enhance the user experience.

It should be noted that g is an integer greater than or equal to 2 and less than f. When g is equal to 2, that is, the display information of the second sub-pixel to the f-th sub-pixel in each sub-pixel group is identical, and the display information of the second sub-pixel to the f-th sub-pixel is different from the display information of the first sub-pixel.

Figure 10:
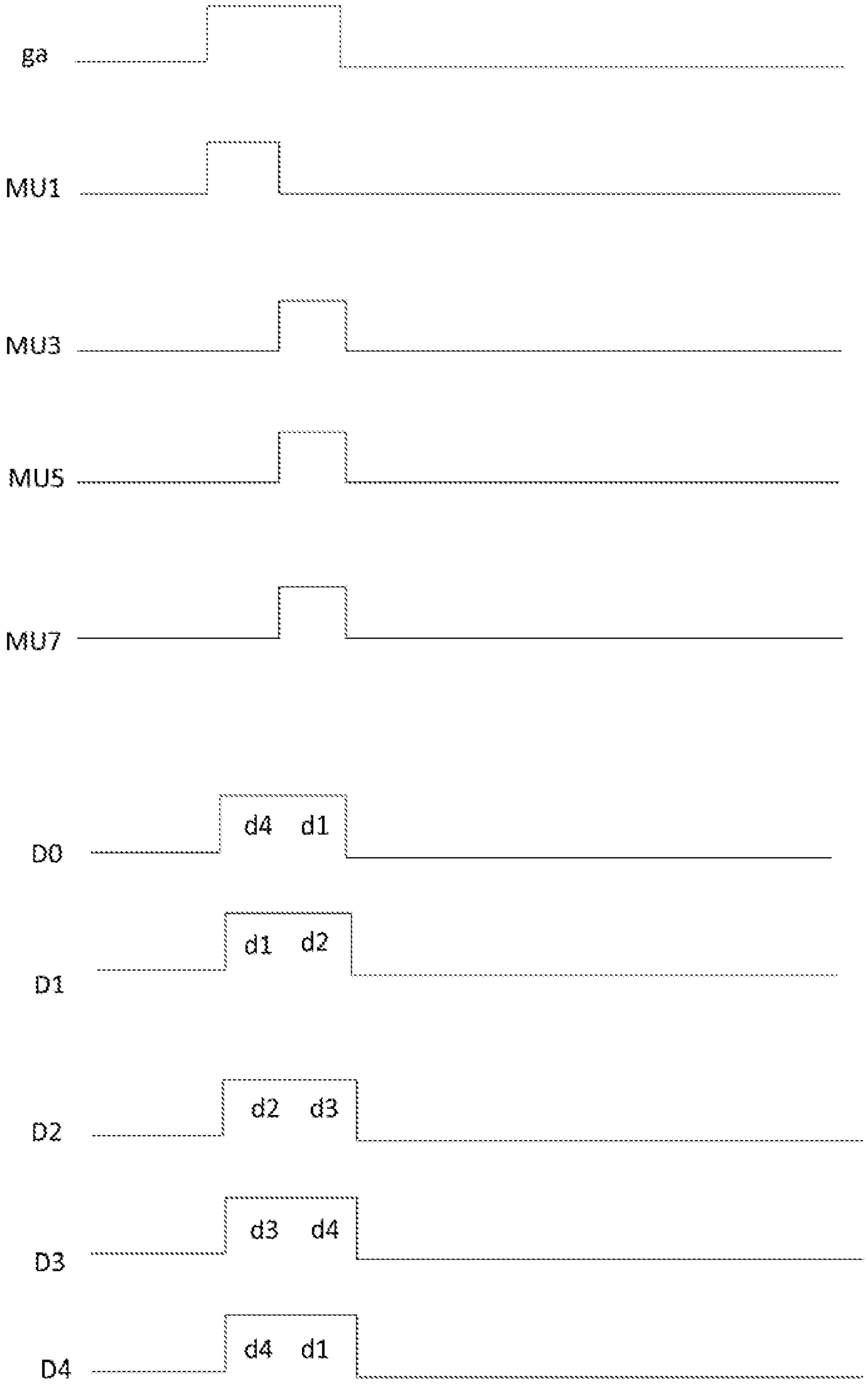
FIG. 10 is another timing sequence diagram of a method for driving a display device according to an embodiment of the present disclosure.

In a specific implementation, when it is determined that the current display mode is the second display mode, and when the user's eyes move one sub-pixel to the right relative to FIG. 3. That is, g=2, the correspondence between viewpoints P and the sub-pixels can be as shown in FIG. 4, and the corresponding timing diagram is shown in FIG. 10. In FIG. 10, di represents the data signal corresponding to the display information of the i-th viewpoint Pi in the pixel island. That is, the data signals d4 and d1 are sequentially input to DO, the data signals d1 and d2 are sequentially input to D1, the data signals d2 and d3 are sequentially input to D2, the data signals d3 and d4 are sequentially input to D3, and the data signals d4 and d1 are sequentially input to D4. A first data selection control signal is provided to MU1, and then the first data selection control signal is simultaneously provided to MU3, MU5 and MU7, to control T11 in each data selection circuit 8 to be turned on first, and then control T12, T13 and T14 to be turned on simultaneously. A second data selection control signal is provided to MU2, MU4, MU6 and MU8 simultaneously, to control the four second selection switches T21, T22, T23 and T24 in each data selection circuit 8 to be turned off. In this way, the combined display solution corresponding to FIG. 4 can be realized.

Figure 11:
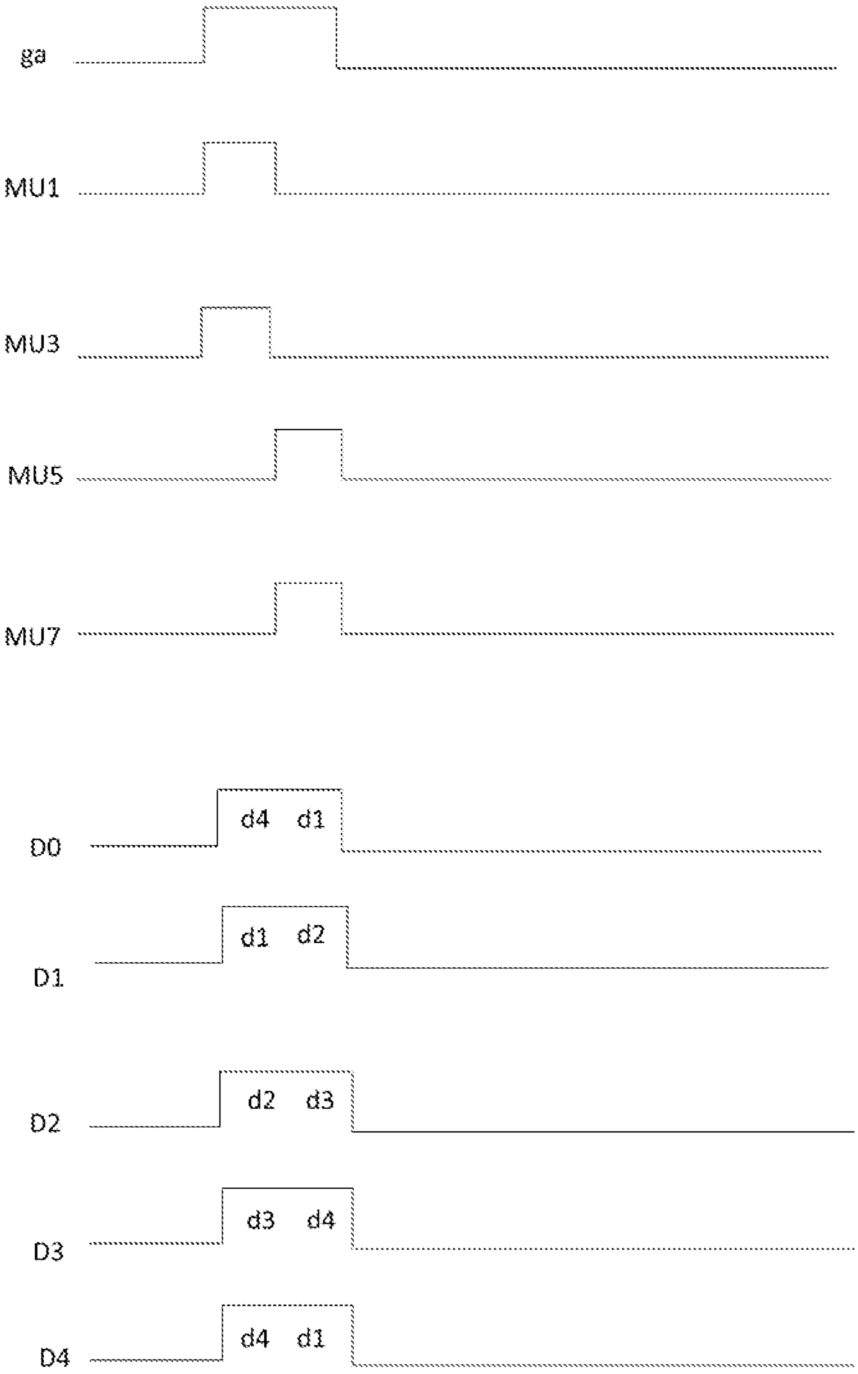
FIG. 11 is another timing sequence diagram of a method for driving a display device according to an embodiment of the present disclosure.

In a specific implementation, when it is determined that the current display mode is the second display mode, and when the user's eyes continue to move, the gaze region moves to the right by one sub-pixel relative to FIG. 4, that is, g=3, the correspondence of the viewpoints P and the sub-pixel, for example, may be as shown in FIG. 5, and the corresponding timing diagram is shown in FIG. 11. In FIG. 11, di represents the data signal corresponding to the display information of the i-th viewpoint Pi in the pixel island. That is, the data signals d4 and d1 are sequentially input to DO, the data signals d1 and d2 are sequentially input to D1, the data signals d2 and d3 are sequentially input to D2, the data signals d3 and d4 are sequentially input to D3, and the data signals d4 and d1 are sequentially input to D4. The first data selection control signal is simultaneously provided to MU1 and MU3, and then the first data selection control signal is simultaneously provided to MU5, MU7, to control T11 and T12 in each data selection circuit 8 to be turned on simultaneously first, and then control T13 and T14 to be turned on simultaneously. The second data selection control signal is simultaneously provided to MU2, MU4, MU6 and MU8, to control the four second selection switches T21, T22, T23 and T24 in each data selection circuit 8 to be turned off. In this way, the combined display solution corresponding to FIG. 5 can be realized.

It should be noted that, as shown in FIG. 10 and FIG. 11, using only a group of multiplexers in the data selection circuits, different data signals can be provided to a sub-pixel group through the multiplexers by adjusting the timing. However, in the second display mode, the refresh frequency of the display device needs to be doubled, and the power consumption of the display device is affected when the system resources of the display device are insufficient. Based on this, when the display mode is the second display mode, embodiments of the present disclosure further provide the following driving method.

In some embodiments, when it is determined that the current display mode is the second display mode, the providing the data selection control signals to the data selection control lines according to the display information, and the providing the data signal corresponding to the display information provided by the data input line to each data line corresponding to the pixel island in the gaze region through the data selection circuits, further includes:

in some sub-pixel groups, when the display information of the first sub-pixel to the (g−1)-th sub-pixel is identical, the display information of the g-th sub-pixel to the f-th sub-pixel is identical, and the display information of the (g−1)-th sub-pixel is different from the display information of the g-th sub-pixel, providing the first data selection control signal to the data selection lines coupled to the 1st to (g−1)-th second selection switches and the g-th to f-th first selection switches, to control the 1st to (g−1)-th second selection switches and the g-th to f-th first selection switches in each data selection circuit to be turned on simultaneously, transmitting a data signal of a data input line coupled to first electrodes of the 1st to (g−1)-th second selection switches and first electrodes of the g-th to f-th first selection switches to data lines coupled to second electrodes of the 1st to (g−1)-th second selection switches and second electrodes of the g-th to f-th first selection electrodes;

simultaneously, providing the second data selection control signal to the data selection lines coupled to the 1st to (g−1)-th first selection switches and the g-th to f-th second selection switches to control the 1st to (g−1)-th first selection switches and the g-th to f-th second selection switches in each data selection circuit to be turned off.

Figure 12:
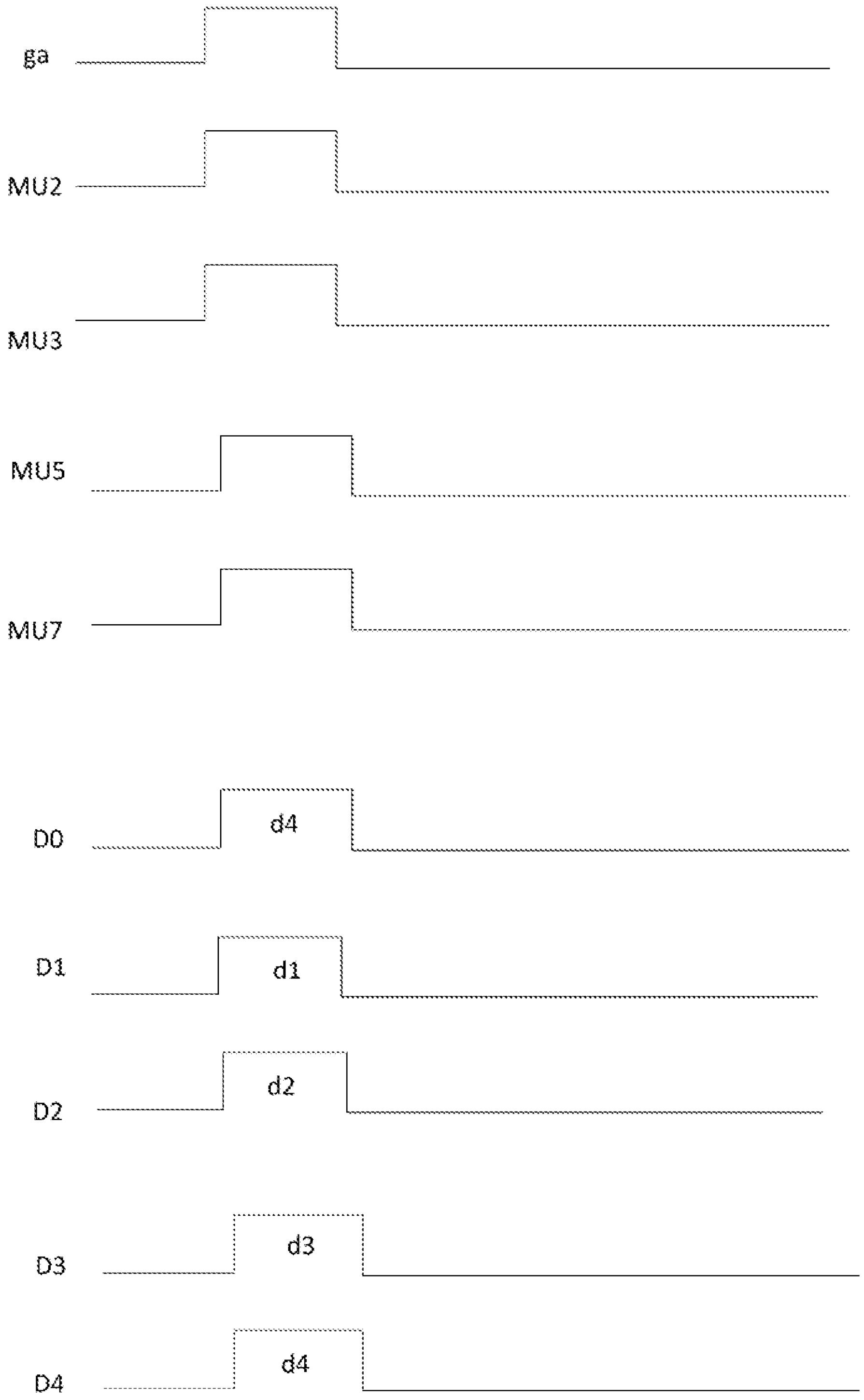
FIG. 12 is another timing sequence diagram of a method for driving a display device according to an embodiment of the present disclosure.

In a specific implementation, when it is determined that the current display mode is the second display mode, and when the user's eyes move one sub-pixel to the right relative to FIG. 3, that is, g=2, the correspondence between the viewpoints P and the sub-pixels may be, for example, as shown in FIG. 4, and the corresponding timing diagram is shown in FIG. 12. In FIG. 12, di represents the data signal corresponding to the display information of the i-th viewpoint Pi in the pixel island. That is, the data signal d4 is input to DO, the data signal d1 is input to D1, the data signal d2 is input to D2, the data signal d3 is input to D3, and the data signal d4 is input to D4. The first data selection control signal is simultaneously provided to MU2, MU3, MU5 and MU7 to control T21, T12, T13 and T14 in each data selection circuit 8 to be turned on simultaneously. The second data selection control signal is simultaneously provided to MU1, MU4, MU6 and MU8 to control T11, T22, T23 and T24 in each data selection circuit 8 to be turned off. In this way, the combined display solution corresponding to FIG. 4 can be realized.

Figure 13:
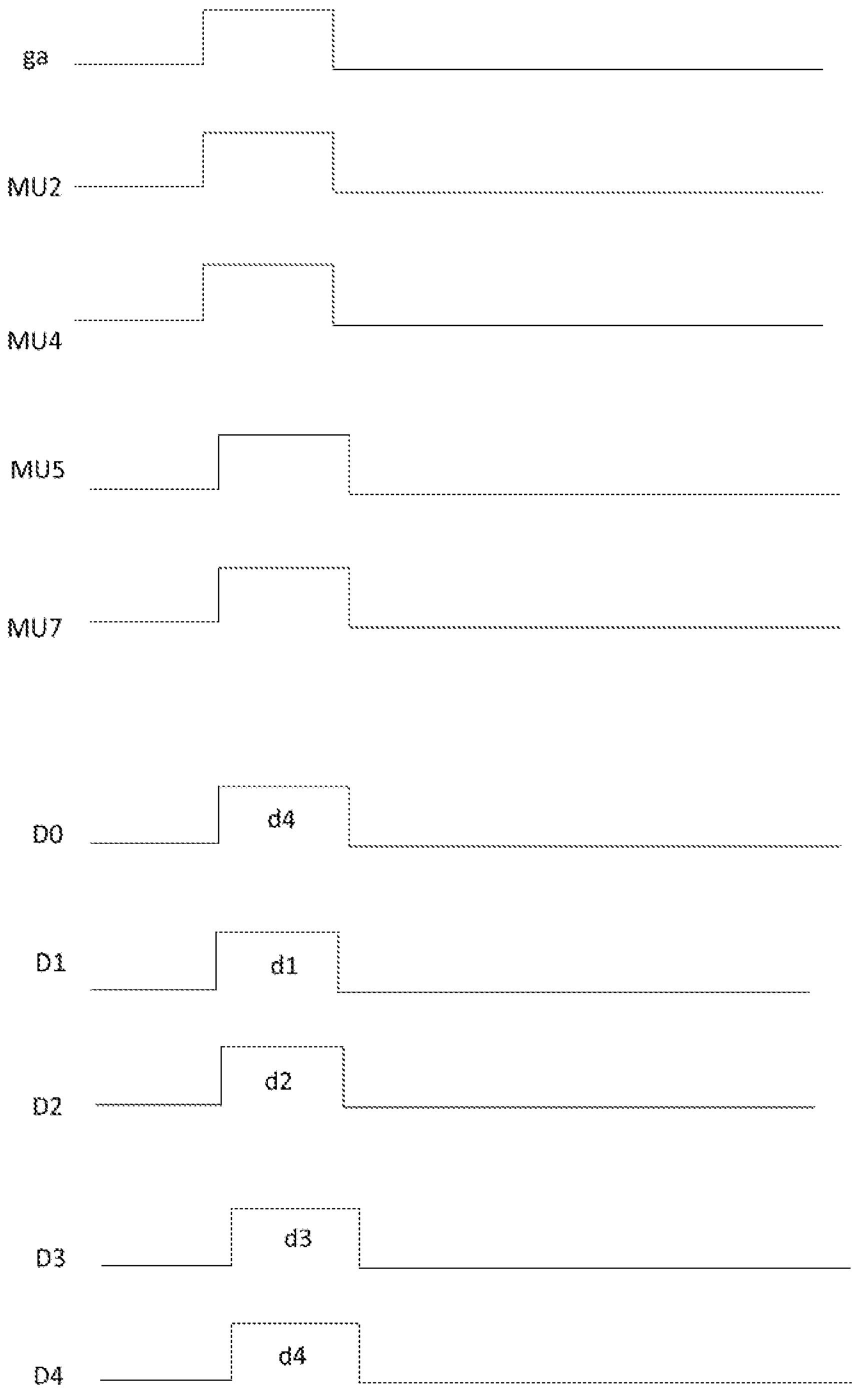
FIG. 13 is another timing sequence diagram of a method for driving a display device according to an embodiment of the present disclosure.

In a specific implementation, when it is determined that the current display mode is the second display mode, and when the user's eyes continue to move, the gaze region moves to the right by one sub-pixel relative to FIG. 4, that is, g=3, the correspondence between the viewpoints P and the sub-pixels, for example, may be as shown in FIG. 5, and the corresponding timing diagram is shown in FIG. 13. In FIG. 13, di represents the data signal corresponding to the display information of the i-th viewpoint Pi in the pixel island. That is, the data signal d4 is input to D0, the data signal d1 is input to D1, the data signal d2 is input to D2, the data signal d3 is input to D3, and the data signal d4 is input to D4. The first data selection control signal is simultaneously provided to MU2, MU4, MU5 and MU7 to control T21, T22, T13 and T14 in each data selection circuit 8 to be turned on simultaneously. The second data selection control signal is simultaneously provided to MU1, MU3, MU6 and MU8 to control T11, T12, T23 and T24 in each data selection circuit 8 to be turned off. In this way, the combined display scheme corresponding to FIG. 5 can be realized.

The method for driving the display device according to embodiments of the present disclosure can not only make the display information of the sub-pixels transition smoothly with the movement of the human eyes when the positions of the human eyes change, but also improve the display effect and user experience. As shown in FIG. 12 and FIG. 13, a plurality of groups of multiplexers in the data selection circuits are used to provide different data signals to a sub-pixel group through the multiplexers, and there is no need to increase the refresh frequency of the display device in the second display mode. In the case of insufficient system resources of the display device, the power consumption of the display device can be saved.

It should be noted that, in FIG. 8 to FIG. 13, the first data selection control signal for controlling the selection switch to be turned on is a high-level signal, and the second data selection control signal for controlling the selection switch to be turned off is a low-level signal.

To sum up, in the display panel, the display device and the driving method thereof according to embodiments of the present disclosure, the signal of the data input line is provided to the data lines by using the data selection circuit, so that the number of data input lines can be smaller than the number of data lines, thus, the amount of data input can be reduced. In addition, each data selection circuit in the display panel according to embodiments of the present disclosure includes at least two multiplexers, and different multiplexers in each data selection circuit are coupled to different data input lines. In this way, for one data selection circuit, under the control of the signals of a plurality of data selection control lines, signals of the same data input line can be respectively provided to each of the coupled data lines, and the signals of different data input lines can also be provided to corresponding data lines through different multiplexers respectively. That is, a plurality of data lines connected to the same data selection circuit may be input with the same data signal, or may be input with the data signals that are not completely the same. When a plurality of sub-pixels in the same row of each pixel island need to be combined for display, if the positions of the human eyes change, the sub-pixels combined for display are also changed, the display information of the sub-pixels combined for display may be changed accordingly by using the data selection circuits of the display panel according to embodiments of the present disclosure, and the display information of the sub-pixels may be smoothly transitioned with the movement of human eyes, thereby improving the display effect and user experience.

Although embodiments of the disclosure have been described, additional changes and modifications to these embodiments may be made to these embodiments once the basic inventive concepts are known to those skilled in the art. Therefore, the appended claims are intended to be interpreted to encompass embodiments as well as all changes and modifications falling within the scope of the present disclosure.

Apparently, those skilled in the art can make various changes and modifications to embodiments of the present disclosure without departing from the spirit and scope of embodiments of the present disclosure. In this way, if the modifications and variations of embodiments of the present disclosure fall within the scope of the claims of the present disclosure and equivalent technologies, the present disclosure also intends to include these modifications and variations.

What is claimed is:

1. A display panel, comprising:

a base substrate, comprising a display region and a peripheral region disposed outside the display region;

a plurality of data lines, located at a side of the base substrate, and extending from the display region to the peripheral region; wherein each of the plurality of data lines extends along a first direction, and the plurality of data lines are arranged along a second direction; and the first direction intersects with the second direction;

a plurality of scan lines, located at the side of the base substrate; wherein each of the plurality of scan lines extends along the second direction and the plurality of scan lines are arranged along the first direction;

a plurality of sub-pixels, respectively located at regions defined by the plurality of scan lines and the plurality of data lines; wherein at least two sub-pixels adjacent in the first direction and the second direction form a pixel island; and color of light emitted by any two adjacent sub-pixels in the second direction is identical;

a plurality of data selection control lines, arranged at the peripheral region and located at a same side of the base substrate as the plurality of data lines;

a plurality of data input lines, arranged at the peripheral region and locate at the same side of the base substrate as the plurality of data selection control lines; and a plurality of data selection circuits, arranged at the peripheral and located at the same side of the base substrate as the plurality of data selection control lines;

wherein each data selection circuit comprises at least two selection switch groups;

wherein each selection switch group comprises: an input terminal, a plurality of control terminals, and a plurality of output terminals;

in wherein within each data selection circuit, each input terminal of different selection switch groups is coupled to a different data input line, each control terminal of different selection switch groups is coupled to a different data selection control line, and each i-th output terminal of different selection switch groups is coupled to a same data line, wherein, i is a positive integer;

wherein for each two adjacent data selection circuits, a left selection switch group within a first data selection circuit among the two adjacent data selection circuits and a right selection switch group within a second data selection circuit among the two adjacent data selection circuits are coupled to a same data input line; wherein the left selection switch group and the right selection switch group are connected with different data selection control lines;

and each of the plurality of data selection circuits is configured to: under control of signals of the plurality of data selection control lines, respectively provide a signal of a corresponding data input line to each coupled data line.

2. The display panel according to claim 1, wherein the pixel island comprises a plurality of sub-pixel rows arranged along the first direction; each sub-pixel row comprises: h number of sub-pixels arranged along the second direction; each sub-pixel row is divided into a number of sub-pixel groups, each sub-pixel group comprises f number of sub-pixels, wherein, a=h/f, a, h, f are all positive integers greater than 1;

each sub-pixel group is coupled to at least one data selection circuit through data lines, and different sub-pixel groups are coupled to different data selection circuits through data lines; and each selection switch group comprises f number of output terminals and f number of control terminals.

3. The display panel according to claim 2, wherein each data selection circuit comprises a first selection switch group and a second selection switch group;

a quantity m of the plurality of data selection circuits and a quantity n of the plurality of data input lines satisfy: n=m+1; and a first selection switch group of the j-th data selection circuit and a second selection switch group of the (j+1)-th data selection circuit are coupled to the j-th data input line, wherein j is a positive integer smaller than m.

4. The display panel according to claim 3, wherein the first selection switch group comprises f number of first selection switches; each first selection switch comprises a control electrode, a first electrode, and a second electrode; control electrodes of different first selection switches are coupled to different data selection control lines; first electrodes of different first selection switches are coupled to a same data input line; and second electrodes of different first selection switches are coupled to different data lines;

the second selection switch group comprises f number of second selection switches; each second selection switch comprises a control electrode, a first electrode, and a second electrode; control electrodes of different second selection switches are coupled to different data selection control lines; first electrodes of different second selection switches are coupled to a same data input line; and second electrodes of different second selection switches are coupled to different data lines; and in each data selection circuit, a second electrode of the i-th first selection switch in the first selection switch group and a second electrode of the i-th second selection switch in the second selection switch group are coupled to a same data line.

5. The display panel according to claim 4, wherein the first selection switch comprises a first transistor; a control electrode of the first transistor is coupled to a data selection control line, and a first electrode of the first transistor is coupled to a data input line, a second electrode of the first transistor is coupled to a data line; and the second selection switch comprises a second transistor; a control electrode of the second transistor is coupled to a data selection control line, a first electrode of the second transistor is coupled to a data input line, and a second electrode of the second transistor is coupled to a data line.

6. The display panel according to claim 4, wherein the display panel comprises 2f number of data selection control lines.

7. The display panel according to claim 6, wherein control electrodes of the i-th first selection switches in different data selection circuits are coupled to a same data selection control line; and control electrodes of the i-th second selection switches in different data selection circuits are coupled to a same data selection control line.

8. The display panel according to claim 2, wherein the pixel island comprises: a first sub-pixel row, a second sub-pixel row and a third sub-pixel row that are arranged along the first direction;

the first sub-pixel row comprises a plurality of sub-pixels with first color arranged along the second direction;

the second sub-pixel row comprises a plurality of sub-pixels with second color arranged along the second direction; and the third sub-pixel row comprises a plurality of sub-pixels with third color arranged along the second direction.

9. The display panel according to claim 2, wherein each sub-pixel row in the pixel island comprises 16 number of sub-pixels; each sub-pixel row is divided into 4 number of sub-pixel groups, and each sub-pixel group comprises 4number of sub-pixels; and each selection switch group comprises 1 input terminal, 4 number of control terminals and 4 number of output terminals.

10. A display device, comprising the display panel according to claim 1.

11. The display device according to claim 10, further comprising:

a lenticular lens structure, located at a light emitting side of the display panel; and the lenticular lens structure comprises a plurality of lenticular lenses arranged in an array.

12. The display device according to claim 10, further comprising:

a human eye-tracking system, configured to determine a gaze region of user's eyes on the display device in real time.

13. A method for driving the display device according to claim 10, comprising:

determining a current display mode, and determining a gaze region of user's eyes on the display panel in real time;

determining display information of each sub-pixel of a pixel island corresponding to the gaze region according to the current display mode and the gaze region; and providing data selection control signals to data selection control lines according to the display information; and providing a data signal corresponding to the display information provided by a data input line to each data line corresponding to the pixel island in the gaze region through data selection circuits.

14. The method according to claim 13, wherein the determining the gaze region of the user's eyes on the display panel in real time comprises:

acquiring the gaze region of the user's eyes on the display panel through a human eye-tracking system;

the determining the display information of each sub-pixel of the pixel island corresponding to the gaze region according to the current display mode and the gaze region, comprises:

determining view information viewed by the user according to the current display mode and the gaze region of the user's eyes on the display panel; and determining a target sub-pixel in a pixel island corresponding to the view information according to the view information, and determining display information of the target sub-pixel corresponding to the view information.

15. The method according to claim 14, wherein the determining the current display mode comprises:

determining that the current display mode is a first display mode when system resource occupancy of the display device meets a preset condition; wherein, in the first display mode, each sub-pixel in a sub-pixel row of the pixel island corresponds to one viewpoint; and determining that the current display mode is a second display mode when the system resource occupancy of the display device does not meet the preset condition; wherein, in the second display mode, f number of adjacent sub-pixels in a sub-pixel row of the pixel island correspond to one viewpoint, wherein the sub-pixel row of the pixel island comprises h number of sub-pixels, h/f is a positive integer; h and f are both positive integers greater than 1.

16. The method according to claim 15, wherein each data selection circuit comprises a first selection switch group and a second multiplexerselection switch group, the first selection switch group comprises f number of first selection switches, and the second selection switch group comprises f number of second selection switches;

when determining that the current display mode is the first display mode, the providing the data selection control signals to the data selection control lines according to the display information; and the providing the data signal corresponding to the display information provided by the data input line to each data line corresponding to the pixel island in the gaze region through the data selection circuits, comprises:

providing a first data selection control signal to a plurality of data selection control lines coupled to the first selection switches, to control the f number of first selection switches in each data selection circuit to be turned on sequentially, and transmitting data signals of a data input line coupled to first electrodes of the f number of first selection switches to data lines coupled to second electrodes of the f number of first selection switches; simultaneously, providing a second data selection control signal to a plurality of data selection control lines coupled to the second selection switches, to control the f number of the second selection switches in each data selection circuit to be turned off.

17. The method according to claim 16, wherein each sub-pixel row of the pixel island is divided into a number of sub-pixel groups, wherein, a=h/f, and each sub-pixel group comprises f number of adjacent sub-pixels;

when determining that the current display mode is the second display mode, the providing the data selection control signals to the data selection control lines according to the display information; and the providing the data signal corresponding to the display information provided by the data input line to each data line corresponding to the pixel island in the gaze region through the data selection circuits, comprises:

when the display information of the sub-pixels in each sub-pixel group is identical, providing the first data selection control signal to f number of data selection control lines coupled to the first selection switches, to control the f number of first selection switches in each data selection circuit to be turned on simultaneously, and transmitting a data signal of a data input line coupled to the first electrodes of the f number of first selection switches to the data lines coupled to the second electrodes of the f number of first selection switches;

simultaneously, providing the second data selection control signal to the f number of data selection control lines coupled to the second selection switches, to control the f number of second selection switches in each data selection circuit to be turned off.

18. The method according to claim 17, wherein, when determining that the current display mode is the second display mode, the providing the data selection control signals to the data selection control lines according to the display information; and the providing the data signal corresponding to the display information provided by the data input line to each data line corresponding to the pixel island in the gaze region through the data selection circuits, further comprises:

in some of the sub-pixel groups, when display information of the first sub-pixel to the (g−1)-th sub-pixel is identical, display information of the g-th sub-pixel to the f-th sub-pixel is identical, and the display information of the (g−1)-th sub-pixel is different from the display information of the g-th sub-pixel, providing the first data selection control signal to data selection control lines coupled to the 1st to the (g−1)-th second selection switches and the g-th to the f-th first selection switches, to control the 1st to the (g−1)-th second selection switches and the g-th to the f-th first selection switches in each data selection circuit to be turned on simultaneously, and transmitting a data signal of a data input line coupled to first electrodes of the 1st to the (g−1)-th second selection switches and first electrodes of the g-th to the f-th first selection switches to data lines coupled to second electrodes of the 1st to the (g−1)-th second selection switches and second electrodes of the g-th to the f-th first selection switches; and simultaneously, providing the second data selection control signal to data selection control lines coupled to the 1st to the (g−1)-th first selection switches and the g-th to the f-th second selection switches, to control the 1st to the (g−1)-th first selection switches and the g-th to the f-th second selection switches in each data selection circuit to be turned off.

19. The method according to claim 17, wherein each data selection circuit comprises a first selection switch group and a second selection switch group; when determining that the current display mode is the second display mode, the providing the data selection control signals to the data selection control lines according to the display information; and providing the data signal corresponding to the display information provided by the data input line to each data line corresponding to the pixel island in the gaze region through the data selection circuits, comprises:

in some of the sub-pixel groups, when display information of the first sub-pixel to the (g−1)-th sub-pixel is identical, display information of the g-th sub-pixel to the f-th sub-pixel is identical, and the display information of the (g−1)-th sub-pixel is different from the display information of the g-th sub-pixel, providing the first data selection control signal to the plurality of data selection control lines coupled to the first selection switches, to control the 1st to the (g−1)-th first selection switches to be turned on simultaneously, control the g-th to the f-th first selection switches to be turned on simultaneously, and control the 1st to the (g−1)-th first selection switches and the g-th to the f-th first selection switches to be turned on sequentially, and transmitting data signals of a data input line coupled to first electrodes of the f number of first selection switches to data lines coupled to second electrodes of the f number of first selection switches;

simultaneously, providing the second data selection control signal to a plurality of data selection control lines coupled to the second selection switches, to control the f number of second selection switches in each data selection circuit to be turned off;

wherein for each data input line, a data signal when the 1st to (g−1)-th first selection switches are turned on is different from a data signal when the g-th to f-th first selection switches are turned on; a data signal of the k-th data input line when the g-th to f-th first selection switches are turned on is identical with a data signal of the (k+1)-th data input line when the 1st to (g−1)-th first selection switches are turned on.

* * * * *